United States Patent
Deghel et al.

(10) Patent No.: US 11,723,052 B2
(45) Date of Patent: Aug. 8, 2023

(54) ADJUSTING A REPETITION OPERATION OF UPLINK CONTROL INFORMATION ASSOCIATED WITH MULTIPLE TRANSMISSION RECEPTION POINTS

(71) Applicant: NOKIA TECHNOLOGIES OY, Espoo (FI)

(72) Inventors: Matha Deghel, Paris (FR); Keeth Saliya Jayasinghe Laddu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 118 days.

(21) Appl. No.: 17/301,497

(22) Filed: Apr. 5, 2021

(65) Prior Publication Data

US 2022/0322357 A1     Oct. 6, 2022

(51) Int. Cl.
*H04W 56/00*     (2009.01)
*H04W 72/53*     (2023.01)
(Continued)

(52) U.S. Cl.
CPC ......... *H04W 72/53* (2023.01); *H04W 72/046* (2013.01); *H04W 72/0446* (2013.01); *H04W 72/1263* (2013.01); *H04W 72/21* (2023.01)

(58) Field of Classification Search
CPC ......... H04W 72/0493; H04W 72/0413; H04W 72/0446; H04W 72/046; H04W 72/1263
(Continued)

(56) References Cited

U.S. PATENT DOCUMENTS

| | | |
|---|---|---|
| 9,515,771 B2 | 12/2016 | Venkob et al. |
| 9,730,199 B2 | 8/2017 | Seo et al. |
| 9,906,347 B2 | 2/2018 | Khairmode et al. |
| 2020/0260442 A1* | 8/2020 | Yi ............... H04L 5/001 |

(Continued)

FOREIGN PATENT DOCUMENTS

WO     2016144143 A1     9/2016

OTHER PUBLICATIONS

3GPP TS-38.213 V16.5.0; 3rd Generation Partnership Project; Technical Specification Group Radio Access Network; NR; Physical layer procedures for control (Release 16); Sophia Antipolis, Valbonne, France; Mar. 2021; 184 pages.

(Continued)

*Primary Examiner* — Sai Ming Chan
(74) *Attorney, Agent, or Firm* — Brake Hughes Bellermann LLP

(57) ABSTRACT

According to an implementation, a method includes obtaining, by a user device of a communication system, configuration information for an adjustment to a repetition operation of uplink control information on a physical uplink control channel, the repetition operation including a plurality of resource repetitions, the plurality of resource repetitions including consecutive resource repetitions, determining, by the user device, whether a gap between the consecutive resource repetitions is less than a switching gap threshold, the consecutive resource repetitions including at least one resource repetition associated with the first transmission-reception-point (TRP) and at least one resource repetition associated with the second TRP; modifying, by the user device, the repetition operation using the configuration information in response to the gap being determined as less than the switching gap threshold, and transmitting, by the user device, the uplink control information according to the modified repetition operation.

21 Claims, 16 Drawing Sheets

(51) Int. Cl.
*H04W 72/1263* (2023.01)
*H04W 72/044* (2023.01)
*H04W 72/0446* (2023.01)
*H04W 72/21* (2023.01)

(58) Field of Classification Search
USPC .......................................................... 370/329
See application file for complete search history.

(56) References Cited

U.S. PATENT DOCUMENTS

| 2021/0185654 A1* | 6/2021 | Taherzadeh Boroujeni ................ H04W 72/082 |
| 2021/0368508 A1* | 11/2021 | Chen ..................... H04L 5/0051 |
| 2022/0225365 A1* | 7/2022 | Cozzo ...................... H04L 1/18 |
| 2022/0278776 A1* | 9/2022 | Ling .................... H04L 1/1858 |

OTHER PUBLICATIONS

3GPP TS-38.331 V16.3.1; 3rd Generation Partnership Project; Technical Specification Group Radio Access Network; NR; Radio Resource Control (RRC) protocol specification (Release 16); Sophia Antipolis, Valbonne, France; Jan. 2021; 932 pages.

\* cited by examiner

Repetition Operation 224

Multi-TRP PUCCH Scheme 223

| Inter-slot Repetition 225 | Intra-slot Repetition 227 | Intra-slot Beam Hopping 229 |

Mapping Pattern 226

Resource Repetition(s) 228

| Resource Repetition(s) 228a | — TRP1 |
| Resource Repetition(s) 228b | — TRP2 |

Time Window 242

ADJUSTING A REPETITION OPERATION OF UPLINK CONTROL INFORMATION ASSOCIATED WITH MULTIPLE TRANSMISSION RECEPTION POINTS

TECHNICAL FIELD

This description relates to adjusting a repetition operation of uplink control information associated with multiple transmission-reception-points (multi-TRPs), and in particular, to adjusting the repetition operation to account for switching gaps and/or downlink symbols.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UEs). LTE has included a number of improvements or developments. Aspects of LTE are also continuing to improve.

5G New Radio (NR) development is part of a continued mobile broadband evolution process to meet the requirements of 5G, similar to earlier evolution of 3G and 4G wireless networks. 5G is also targeted at new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services.

A physical uplink control channel (PUCCH) in NR is used to carry uplink control information (UCI) such as a scheduling request (SR), beam failure recovery (BFR), hybrid automatic repeat request acknowledgement (HARQ-ACK), and channel state information (CSI). Also, in NR, a PUCCH repetition operation on multiple slots may be defined for a number of different PUCCH formats (e.g., PUCCH formats 1, 3 and 4), where a PUCCH repetition is used to increase reliability and coverage for the transmitted UCI. It is noted that for PUCCH in NR, there are five formats defined, namely PUCCH formats 0, 1, 2, 3 and 4. The repetition operation (when enabled), includes repeating the PUCCH carrying UCI over multiple consecutive slots. For certain PUCCH formats, a user device may be configured via radio resource control (RRC) with a number of slots for repetitions of a PUCCH transmission.

NR may also support multi-transmission-reception-points (multi-TRPs) for a PUCCH repetition scheme (e.g., inter-slot repetition, intra-slot repetition, or intra-slot beam hopping). A single PUCCH resource may be used for different repetitions towards different TRPs. A repetition operation may define a series of PUCCH repetitions, which may include PUCCH repetitions mapped to different uplink beams and/or different power control parameter sets (and therefore different TRPs). However, in order to switch beams (or power control parameter sets), the repetition operation may require a minimum gap between consecutive PUCCH repetitions. However, conventional approaches have not accounted for switching gaps, which may lead to PUCCH repetitions being discarded, thereby decreasing the reliability of the communication system. Also, a PUCCH repetition overlapping with downlink symbols may be deferred to the next available uplink slot, which may further affect the PUCCH repetitions.

SUMMARY

According to an implementation, a method includes obtaining, by a user device of a communication system, configuration information for an adjustment to a repetition operation of uplink control information on a physical uplink control channel, the repetition operation including a plurality of resource repetitions, the plurality of resource repetitions including consecutive resource repetitions, determining, by the user device, whether a gap between the consecutive resource repetitions is less than a switching gap threshold, the consecutive resource repetitions including at least one resource repetition associated with the first transmission-reception-point (TRP) and at least one resource repetition associated with the second TRP; modifying, by the user device, the repetition operation using the configuration information in response to the gap being determined as less than the switching gap threshold, and transmitting, by the user device, the uplink control information according to the modified repetition operation.

According to an implementation, an apparatus comprises at least one processor; and at least one memory including computer program code, the at least one memory and the computer program code configured to, with the at least one processor, cause the apparatus to obtain configuration information for an adjustment to a repetition operation of uplink control information on a physical uplink control channel, the repetition operation defining a number of resource repetitions towards multiple transmission-reception-point (TRP), insert a deferral period to account for one or more downlink symbols within a time window of the repetition operation, determine whether a gap between consecutive resource repetitions is less than a switching gap threshold, the consecutive resource repetitions including a first resource repetition associated with a first TRP and a second resource repetition associated with a second TRP, modify the repetition operation using the configuration information in response to the gap being determined as less than the switching gap threshold such that the gap is increased to be to equal or greater than the switching gap threshold, and transmit the uplink control information according to the modified repetition operation.

According to an implementation, a non-transitory computer-readable medium stores executable instructions that when executed by at least one processor cause the at least one processor to transmit, by a base station of a communication system, configuration information for an adjustment to a repetition operation of uplink control information on a physical uplink control channel, the repetition operation including at least one resource repetition associated with a first transmission-reception-point (TRP) and at least one resource repetition associated with a second TRP, the configuration information identifying an adjustment operation to be used by a user device to modify the repetition operation in response to a gap between the at least one resource repetition associated with the first TRP and the at least one resource repetition associated with the second TRP being less than a switching gap threshold, transmit, by the base station, a resource activation message to configure or schedule the uplink control information to be transmitted using the repetition operation, and receive, by the base station, the uplink control information according to the modified repetition operation.

The details of one or more examples of implementations are set forth in the accompanying drawings and the description below. Other features will be apparent from the description and drawings, and from the claims.

BRIEF DESCRIPTION OF THE DRAWINGS

FIG. 2C illustrates an example of the repetition operation according to an example implementation.

DETAILED DESCRIPTION

Figure 1:
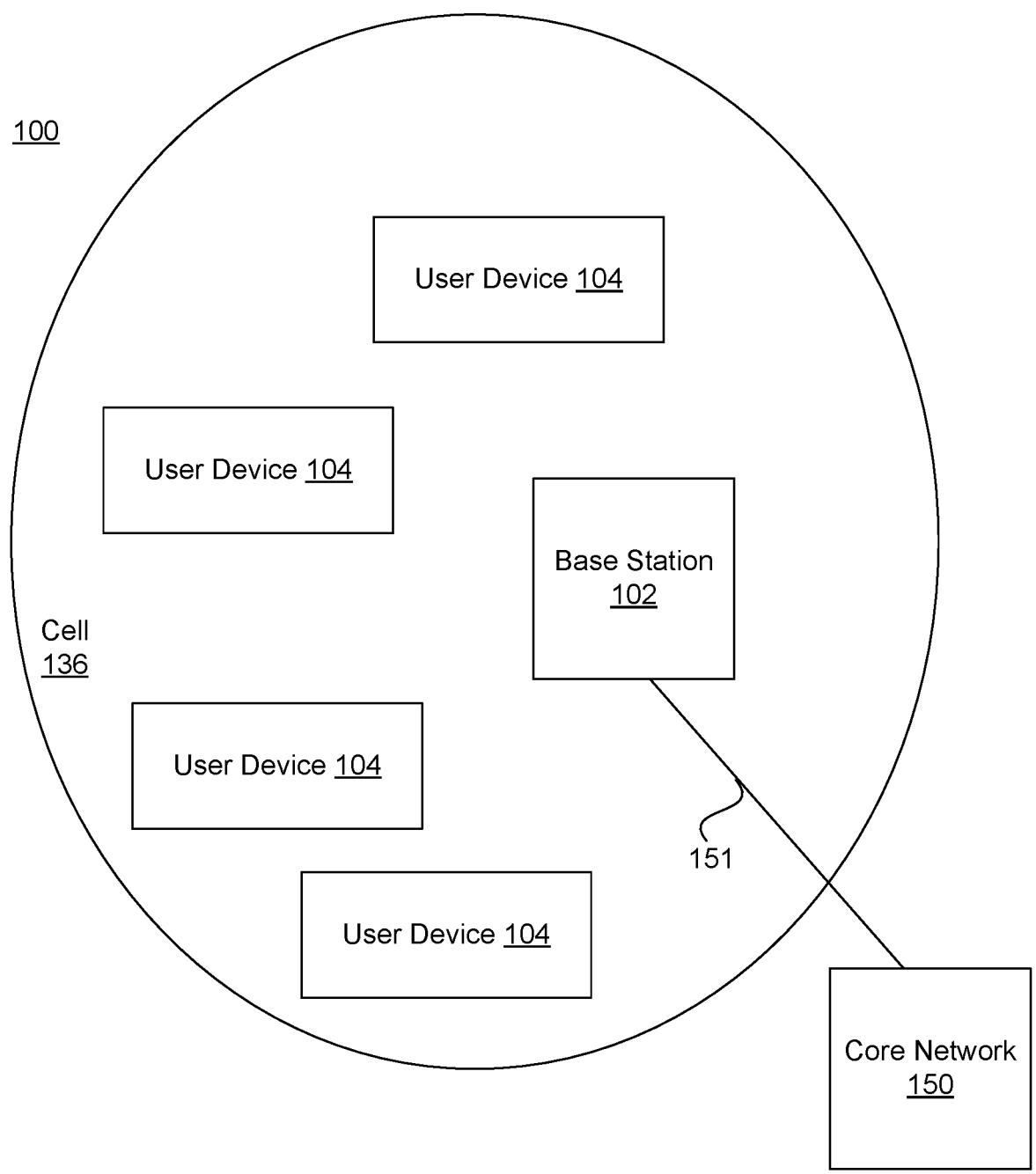
FIG. 1 illustrates a wireless communication system according to an example implementation.

The present disclosure relates to a system and/or method for adjusting a multi-TRP repetition/transmission operation of uplink control information that is transmitted on a physical uplink control channel (PUCCH) to account for switching gaps and/or downlink symbols. The embodiments discussed herein may be applicable to any multi-TRP repetition/transmission scheme such as inter-slot repetition, intra-slot repetition, or intra-slot beam hopping. A repetition operation for repeating uplink control information on a physical uplink control channel may define a sequence of resource repetitions (also referred to as PUCCH repetitions), where the resource repetitions are associated with different transmission-reception-points (TRPs) (may also be referred to as transceivers or transmission/reception points), or equivalently, with different spatial relation information (i.e., UL beams) or different power control parameter sets. The uplink control information may include any type of control information that can transmitted from the user device to the base station via the physical uplink control channel such as a scheduling request (SR), beam failure recovery (BFR), hybrid automatic repeat request acknowledgement (HARQ-ACK), and/or channel state information (CSI), etc. If the uplink control information is a HARQ-ACK, each resource repetition of the repetition operation may include a resource (e.g., a PUCCH resource) that defines the parameters of the HARQ-ACK, and these resource repetitions can be transmitted to different TRPs.

In some examples, the repetition operation may include consecutive repetitions such as a first resource repetition that is associated with a first TRP (TRP1), and a second resource repetition that is associated with a second TRP (TRP2). In order to properly accommodate beam switching and/or power control parameter set switching (e.g., switching from TRP1 to TRP2) during a time window, a minimum switching gap may be required between the first resource repetition and the second resource repetition. In some examples, if the gap between the first resource repetition and the second resource repetition is less than a switching gap threshold, the gap may be increased to be equal to or greater than the switching gap threshold. In some examples, the second resource repetition is shifted (e.g., deferred) by an offset period to a time that is later in the time window or a subsequent time window such that the gap between the resource repetitions is equal to or greater than the switching gap threshold.

The user device may obtain configuration information for an adjustment to the repetition operation. In some examples, the user device receives the configuration information over a network from a base station during a radio resource control (RRC) protocol. In some examples, at least part of the configuration information may be hardcoded in specifications or preconfigured at the user device. The configuration information may identify one or more adjustment operations (or rules) to account for switching gaps and/or downlink symbols during the repetition operation. For example, the adjustment operations may include a deferral operation that can insert a deferral period into the time window to account for the downlink symbols.

Also, the adjustment operations may include a shifting operation that can insert an offset period between consecutive resource repetitions associated with different TRPs (or uplink beams or power control parameter sets) so that the gap between the resource repetitions is equal to or greater than the switching gap threshold. In some examples, the adjustment operations may include an altering operation that adjusts or modifies the mapping pattern (e.g., uplink beam mapping or power control parameter set mapping) in which one or more resource repetitions are re-mapped to a different TRP and/or one or more resource repetitions are discarded (e.g., removed from the repetition operation). In some examples, the adjustment operations may include an omitting operation that omits one or more symbols from one or both of the consecutive resource repetitions associated with different TRPs so that the gap between the switching gap threshold is equal to or above the switching gap threshold. These and other features are further explained with reference to the figures.

FIG. 1 is a block diagram of a wireless communication system 100 according to example implementation. The wireless communication system 100 includes a base station 102 configured to be connected to a plurality of user devices 104. The base station 102 provides wireless coverage within a cell 136, including to the user devices 104. Although four user devices 104 are shown as being connected or attached to the base station 102, any number of user devices 104 may be provided. The base station 102 is also connected to a core network 150 via an interface 151. In some examples, the interface 151 may be an S1 interface or NG interface.

The user devices 104 may also be referred to as mobile stations or user equipments. The base station 102 may also be referred to as an access point (AP), an enhanced Node B (eNB), a base station, next generation Node B (gNB), a next generation enhanced Node B (ng-eNB), or a network node. The terms user device and user equipment may be used interchangeably. A base station 102 may also include or may be referred to as a radio access network (RAN) node, and may include a portion of a base station or a portion of a RAN node (e.g., such as a centralized unit (CU) and/or a distributed unit (DU) in the case of a split base station). At least part of the functionalities of a base station 102 may also be carried out by any node, server or host which may be operably coupled to a transceiver, such as a remote radio head.

In some examples, a base station (BS) node (e.g., the base station 102) may be part of a mobile telecommunication system. A RAN (radio access network) may include one or more BSs or RAN nodes that implement a radio access technology, e.g., to allow one or more user devices 104 to have access to a network or the core network 150. Thus, for example, the RAN (RAN nodes, such as BSs or gNBs) may reside between one or more user devices 104 and a core network 150. In some examples, each RAN node (e.g., BS, eNB, gNB, CU/DU, etc.) or BS may provide one or more wireless communication services for one or more user devices 104, e.g., to allow the user devices 104 to have wireless access to a network, via the RAN node. Each RAN node or BS may perform or provide wireless communication services, e.g., such as allowing the user devices 104 to establish a wireless connection to the RAN node and sending data to and/or receiving data from one or more of the user devices 104. For example, after establishing a connection to a user device 104, a RAN node (e.g., BS, eNB, gNB, CU/DU, etc.) may forward data to the user device 104 that is received from a network or the core network 150, and/or forward data received from the user device 104 to the network or core network 150. RAN nodes (e.g., BS, eNB, gNB, CU/DU, etc.) may perform a wide variety of other wireless functions or services, e.g., such as broadcasting control information (e.g., such as system information) to the user devices 104, paging the user devices 104 when there is data to be delivered to the user device 104, assisting in handover of a user device 104 between cells, scheduling of resources for uplink data transmission from the user device(s) 104 and downlink data transmission to the user device(s) 104, sending control information to configure one or more user devices 104, and the like. These are a few examples of one or more functions that a RAN node or BS may perform. A base station 102 may also be a DU (Distributed Unit) part of an IAB (Integrated Access and Backhaul) node (a.k.a., a relay node). The DU facilitates the access link connection(s) for an IAB node.

A user device 104 (e.g., user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device 104 may also be (or may include) a nearly exclusive uplink only device, of which an example is a camera or video camera loading images or video clips to a network. A user device 104 may be also MT (Mobile Termination) part of IAB (Integrated Access and Backhaul) node (a.k.a., a relay node). MT facilitates the backhaul connection for an IAB node.

In LTE (as an illustrative example), the core network 150 may be referred to as Evolved Packet Core (EPC), which may include a mobility management entity (MME) which may handle or assist with mobility/handover of user devices between base stations 102, one or more gateways that may forward data and control signals between the base stations 102 and packet data networks or the Internet, and other control functions or blocks. Other types of wireless networks, such as 5G (which may be referred to as New Radio (NR)) may also include a core network 150.

In addition, by way of illustrative example, the various example embodiments or techniques described herein may be applied to various types of user devices or data service types or may apply to user devices 104 that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)—related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of 10-5 and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to an eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, eMBB, URLLC, etc., or any other wireless network or wireless technology. These example networks, technologies or data service types are provided only as illustrative examples.

Figure 2A:
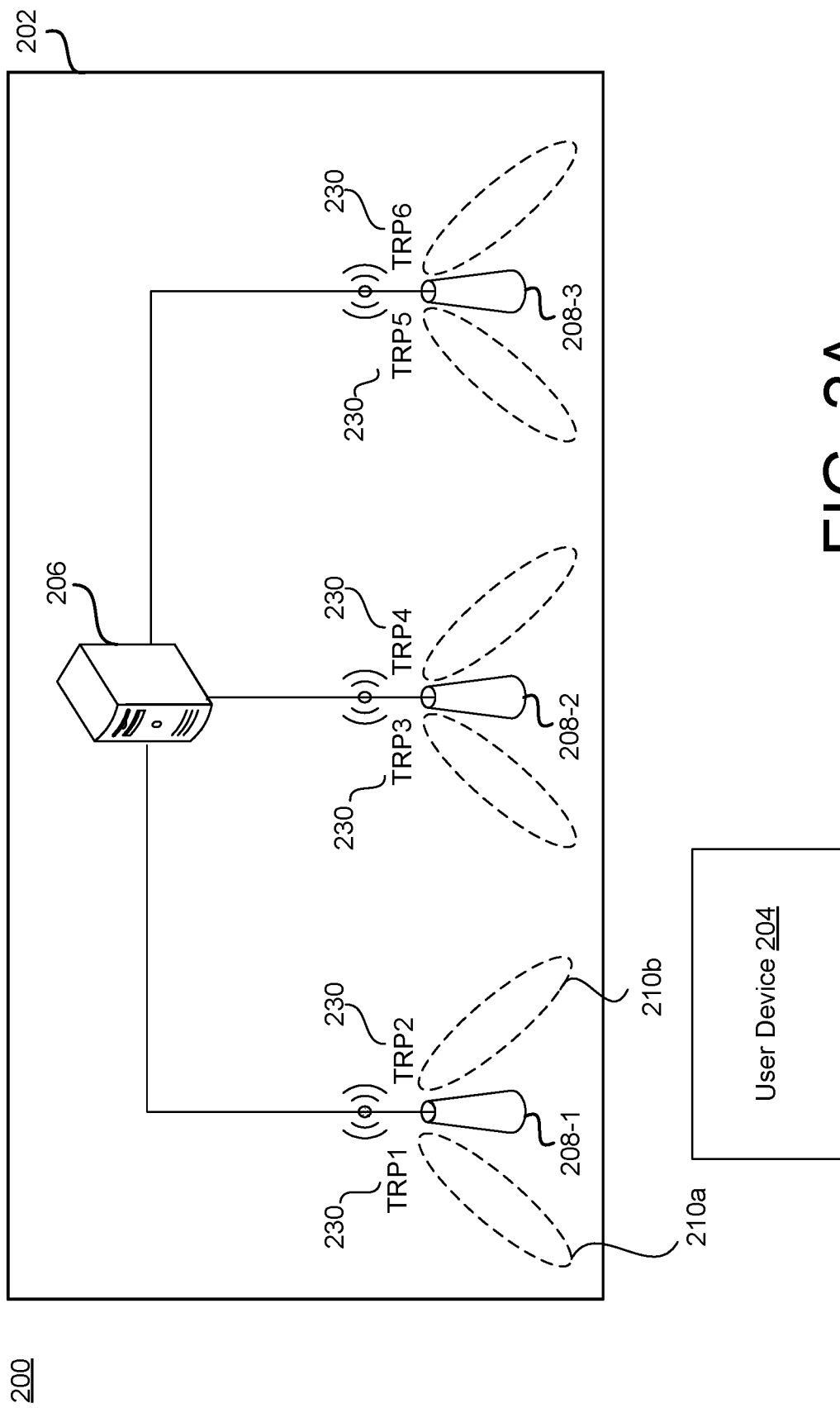
FIG. 2A illustrates a wireless communication system for adjusting a multi-TRP repetition operation of uplink control information that is transmitted on a physical uplink control channel to account for switching gaps and/or downlink symbols according to an example implementation.
Figure 2B:
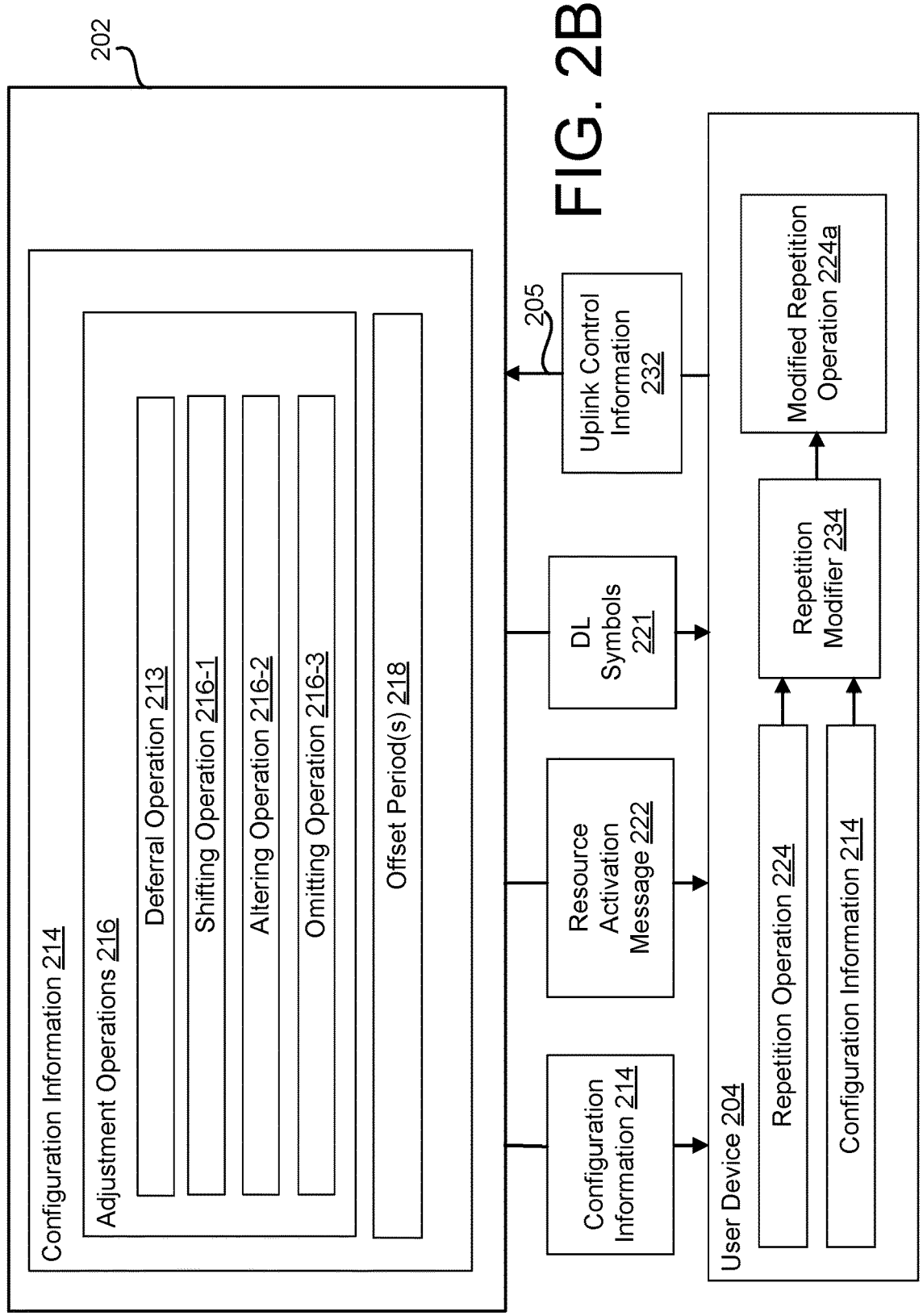
FIG. 2B illustrates the wireless communication system according to an example implementation.

FIGS. 2A through 2C illustrate a wireless communication system 200 for adjusting a multi-TRP repetition operation 224 of uplink control information 232 that is transmitted on a physical uplink control channel (PUCCH) 205 to account for switching gaps (e.g., switching gap 215 in FIGS. 3 through 7) and/or downlink symbols 221. The wireless communication system 200 may be an example of the wireless communication system 100 of FIG. 1 and may include any of the details discussed with reference to that figure.

The wireless communication system 200 includes a base station 202 having multiple remote radio heads (RRHs) such as a first RRH 208-1, a second RRH 208-2, and a third RRH 208-3. The wireless communication system 200 includes a baseband central unit (BBU) 206 connected to the first RRH 208-1, the second RRH 208-2, and the third RRH 208-3. In some examples, the base station 202 is considered a distributed base station (e.g., a distributed gNB). In some examples, the different RRHs may be considered separate base stations (e.g., gNBs). Each RRH may function as transmission reception points (TRPs) 230 connected to the same BBU 206. The first RRH 208-1 may define two TRPs 230, e.g., TRP1 and TRP2. The second RRH 208-2 may define two TRPs 230, e.g., TRP3 and TRP4. The third RRH 208-3 may define two TRPs 230, e.g., TRP5 and TRP6. In some examples, the TRPs are considered different transceivers, where the term TRP and transceiver may be used interchangeably. The user device 204 may transmit uplink control information 232 on the physical uplink control channel 205 via an uplink beam 210a associated with a TRP 230 (e.g., TRP1) and an uplink beam 210b associated with another TRP 230 (e.g., TRP2). In some examples, instead of using uplink beams, TRP1 is associated with a first power control parameter set, and TRP2 is associated with a second power control parameter set. Also, the uplink beam 210a may refer to the beam provided by TRP2, and the uplink beam 210b may refer to the beam provided by TRP3.

Referring to FIG. 2B, the user device 204 may obtain configuration information 214 for an adjustment to a repetition operation 224. In some examples, the configuration information 214 includes PUCCH format configuration. In some examples, the user device 204 receives, over a network, the confirmation information 214 from the base station 202. In some examples, the confirmation information 214 is received by the base station 202 via one or more radio resource control (RRC) messages during an RRC protocol or procedure. In some examples, some or all of the configuration information 214 is preconfigured at the user device 204. The configuration information 214 may include one or more adjustment operations 216 that when executed by the user device 204 are configured to adjust the repetition operation 224 for transmitting uplink control information 232 on the physical downlink control channel 205 to account for switching gaps and/or downlink symbols 221 during the repetition operation 224.

The repetition operation 224 may include a sequence of resource repetitions 228 over a time window 242. In some examples, the repetition operation 224 is not associated with a time window 242. In some examples, the user device 204 may be configured or provided with the number of PUCCH repetitions (e.g., a PUCCH repetition factor). A resource repetition 228 may also be referred to as a PUCCH repetition. A resource repetition 228 is a resource (e.g., a PUCCH resource) carrying uplink control information 232 that is transmitted on the PUCCH 205. The uplink control information 232 may include any type of control information that can transmitted from the user device 204 to the base station 202 via a physical uplink control channel 205 such as a scheduling request (SR), beam failure recovery (BFR), hybrid automatic repeat request acknowledgement (HARQ-ACK), and/or channel state information (CSI), etc. For example, if the uplink control information 232 is a HARQ-ACK, each resource repetition 228 of the repetition operation 224 may include a resource (e.g., a PUCCH resource) that defines the parameters of the HARQ-ACK. In other words, the HARQ-ACK is repeated one or more times during the time window 242 (if configured with a time window 242).

A number of different formats (e.g., PUCCH formats) may be used to carry the SR, BSR, HARQ-ACK, or CSI information. In some examples, PUCCH formats 2, 3, and 4 may be used to carry HARQ-ACK, SR and/or CSI, whereas PUCCH format 0 and 1 may carry SR and/or up to two HARQ-ACK bits. Each format has a format configuration in the PUCCH configuration. For example, the repetition operation 224 for CSI information may include a sequence of resource repetitions 228 in a time window 242, where each resource repetition 228 includes a PUCCH resource having a certain type of PUCCH format (e.g., PUCCH format 2, 3, or 4). The repetition operation 224 for SR may include a sequence of resource repetitions 228 in a time window 242, where each resource repetition 228 includes a PUCCH source having the same type of PUCCH format or a different type of PUCCH format (e.g., 0 or 1).

The time window 242 may have a certain fixed length. The time window 242 may include a number of orthogonal frequency-division multiplexing (OFDM) symbols. In some examples, the time window 242 includes a time slot. In some examples, the time window 242 includes multiple time slots. In some examples, each resource repetition 228 is allocated to a sub-slot of the time window 242. In some examples, the repetition operation 224 occurs over multiple time slots. The repetition operation 224 defines a mapping pattern 226 that maps resource repetitions 228 to different TRPs 230 (may also be referred to as transceivers or transmission/reception points), or equivalently, with different spatial relation information (e.g., UL beams) or different power control parameter sets. In some examples, the mapping pattern 226 includes a beam mapping that maps resource repetitions 228 to different uplink beams associated with the different TRPs 230. In some examples, the mapping pattern 226 includes a power control parameter set mapping that maps resource repetitions 228 to different power control parameter sets associated with the different TRPs 230. For example, the repetition operation 224 may include a sequence of one or more resource repetitions 228a associated with TRP 230a (e.g., TRP1) and one or more resource repetitions 228b associated with TRP 230b (e.g., TRP2).

It noted that spatial relation information may refer to any of UL beam, UL transmission configuration indicator (TCI) state, joint TCI state, common TCI state, spatial filter, TRP link (or simply TRP), etc., and all these terms may be used interchangeably. It is also noted that a power control parameter set may refer to any of spatial relation information, UL beam, UL TCI state, joint TCI state, common TCI state, spatial filter, TRP link (or simply TRP), etc., and all these terms may be used interchangeably.

The repetition operation 224 may be applicable to any type of multi-TRP PUCCH scheme 223 such as inter-slot repetition 225, intra-slot repetition 227, or intra-slot beam hopping 229. In some examples, the repetition operation 224 is the inter-slot repetition 225. The inter-slot repetition 225 includes a resource repetition 228 (e.g., a PUCCH resource) in a time slot and another resource repetition 228 of the PUCCH resource in one or more subsequent time slots. For example, the inter-slot repetition 225 repeats the PUCCH resource across different time slots (e.g., one resource repetition 228 for per time slot for one or more time slots). In some examples, the repetition operation 224 is the intra-slot repetition 227. The intra-slot repetition 227 includes a resource repetition 228 (e.g., a PUCCH resource) in a sub-slot of a time slot, and another resource repetition 228 in another sub-slot of the time slot. For example, the intra-slot repetition 227 repeats the PUCCH resource across different sub-slots of a particular time slot (e.g., one resource repetition 228 per time sub-slot for one or more sub-slots). In some examples, the repetition operation 224 is the intra-slot beam hopping 229. The intra-slot beam hopping 229 may include a UCI that is transmitted in one PUCCH resource in which different sets of symbols have different beams. In other words, the intra-slot beam hopping 229 may include a sequence of resource repetitions 228, where each resource repetition 228 includes a PUCCH hop.

Referring back to FIG. 2B, as indicated above, the user device 204 obtains configuration information 214, which is used to modify the repetition operation 224. For example, configuration information 214 includes one or more adjustment operations 216 that are configured to be applied by the user device 204 to modify the repetition operation 224 to account for switching gaps and downlink symbols 221. In some examples, the adjustment operations 216 include a deferral operation 213, a shifting operation 216-1, an altering operation 216-2, and/or an omitting operation 216-3. In some examples, the adjustment operations 216 includes the deferral operation 213 and at least one of the shifting operation 216-1, the altering operation 216-2, or the omitting operation 216-3. In some examples, the adjustment operations 216 includes the deferral operation 213, the altering operation 216-2, and at least one of the shifting operation 216-1 or the omitting operation 216-3. The user device 204 includes a repetition modifier 234 configured to receive the configuration information 214 (e.g., the adjustment operations 216(s) and the offset period(s) 218) and the repetition operation 224, where the repetition modifier 234 is configured to modify the repetition operation 224 using the adjustment operations and offset period(s) 218 to generate a modified repetition operation 224a. The uplink control information 232 is transmitted by the user device 204 to the base station 202 according to the modified repetition operation 224a.

The deferral operation 213 may include inserting a deferral period (e.g., deferral period 240 in FIGS. 3 through 7) between resource repetitions 228 in the time window 242 to account for DL symbols 221, where DL symbols 221 may be used for downlink transmission(s) to the user device 204 during the deferral period (e.g., the deferral period 240 of FIGS. 3 through 7). According to the embodiments discussed herein, DL symbols 221 may, in addition to the DL symbols due to time-division-duplexing (TDD) configuration (in case of unpaired spectrum), also refer to the symbols corresponding to SS/PBCH Physical Broadcast Channel (PBCH)/Synchronization Signal (SS) block or channel state information—reference signal (CSI-RS) reception. Alternatively, or additionally, DL symbols 221 may refer to any invalid symbols that cannot be used for uplink transmission(s). If the repetition operation 224 specifies a first resource repetition followed by a second resource repetition, the deferral operation 213 may defer or shift the second resource repetition by a deferral period, which may be one, two, or more sub-slots or slots (where a sub-slot or slot consists of a number of symbols). In some examples, no signals are transmitted during the deferral period. In some example, if a resource repetition 228 overlaps (e.g., at least partially overlaps) with downlink symbols scheduled to be transmitted to the user device 204, the deferral operation 213 may indicate to shift the resource repetition to the next available uplink slot or sub-slot.

The shifting operation 216-1 may include inserting an offset period 218 between two adjacent resource repetitions 228 mapped to different TRPs 230 in response to a switching gap (e.g., switching gap 215 of FIGS. 3 through 7) between the adjacent resource repetitions being less than a switching gap threshold (e.g., switching gap threshold 217 of FIGS. 3 through 7). For example, if the repetition operation 224 includes a sequence of resource repetitions 228 having a resource repetition 228a associated with TRP1 and a resource repetition 228b associated with TRP2, and the switching gap between the resource repetition 228a and the resource repetition 228b is less than the switching gap threshold, the user device 204 may apply the shifting operation 216-1 to increase the switching gap by the offset period 218 such that the shifting gap is greater than or equal to the switching gap threshold. In some examples, no signals are transmitted during the offset period 218. In some examples, the shifting operation 216-1 may be defined as a shifting of a second (or subsequent) resource repetition 228 from the initially intended resource allocation to another resource allocation that comes later in time in the time window 242.

In some examples, the shifting operation 216-1 may or may not change the total number of resource repetitions 228. In some examples, the reference point for the shifting operation 216-1 (and the deferral operation 213) for deferring/shifting a resource repetition 228 can be (i) the ending symbol of the previous resource repetition 228, in which case the existing gap, if any, is counted as part of the offset period 218 (or deferral period), or (ii) the starting symbol of the resource repetition 228 (before the shifting/deferral), in which case the existing gap, if any, is not counted as part of the offset period 218 (or deferral period).

In some examples, the offset period 218 is included as part of the configuration information 214. In some examples, the configuration information 214 may indicate the length of the offset period 218. In some examples, the offset period 218 is indicated by a number of symbols. For example, if the offset period 218 identifies the number of symbols as three, the resource repetition 228a or resource repetition 228b is shifted by three symbols. In some examples, the offset period 218 is indicated by the number of sub-slots. For example, if the offset period 218 identifies two sub-slots, the resource repetition 228a or resource repetition 228b is shifted by two sub-slots. In some examples, the offset period 218 is indicated by a number of slots. For example, if the offset period 218 identifies one slot, the resource repetition 228a or resource repetition 228b is shifted by one slot.

In some examples, the offset period 218 is dependent on the type of PUCCH format or type of PUCCH resource. In some examples, the configuration information 214 may indicate different lengths of the offset period 218 for different types of PUCCH formats and/or different types of PUCCH resources. For example, the offset period 218 may have a first offset value when the format of the uplink control information 232 is a first type (e.g., PUCCH format 1) and the offset period 218 may have a second offset value when the format of the uplink control information 232 is a second type (e.g., PUCCH format 3). If the PUCCH resource to be repeated during the repetition operation 224 corresponds to the second type, the second offset value may be used for the offset period 218. If the PUCCH resource to be repeated during the repetition operation 224 corresponds to the first type, the first offset value may be used for the offset period 218. Also, in some examples, the offset period 218 may have a first offset value when the uplink control information 232 is a first type (e.g., scheduling request), and the offset period 218 may have a second offset value when the uplink control information 232 is a second type (e.g., HACK-ACK). If the PUCCH resource to be repeated during the repetition operation 224 corresponds to the second type, the second value may be used for the offset period 218. If the PUCCH resource to be repeated during the repetition operation 224 corresponds to the first type, the first value may be used for the offset period 218.

In some examples, the offset period 218 is dependent on the type/identity of beam or power control parameter set. For example, if the consecutive resource repetitions 228 transition from TRP1 to TRP2, the offset period 218 may have a first offset value. If the consecutive resource repetitions 228 transition from TRP2 to TRP1, the offset period 218 may have a second offset value. Then, depending on the type of beam switching (or power control parameter set switching), the first offset value or the second offset value may be selected for the offset period 218.

The altering operation 216-2 may include modifying the mapping pattern 226 (e.g., the beam mapping or power control parameter mapping) of the repetition operation 224, which may include discarding a particular resource repetition 228 or changing the TRP that is mapped to the resource repetition 228 (e.g., if a resource repetition 228 is mapped to TRP1, the altering operation 216-2 may remap the resource repetition 228 to TRP2 (or vice versa)). In some examples, if at least one of the deferral operation 213 or the shifting operation 216 is applied to at least one resource repetition 228 (e.g., due to DL symbols 221 and/or switching gap(s)), the altering operation 216-2 may be applied.

In some examples, when there is a time window 242 defined for resource repetitions 228, the deferral operation 213 and/or the shifting operation 216-1 may reduce the total number of resource repetitions 228 of the repetition operation 224. In some examples, the user device 204 may be further configured/defined to have a minimum number of resource repetitions 228 towards a particular TRP 230, and if the deferral operation 213 and/or the shifting operation 216-1 reduces the number of resource repetitions 228 towards a TRP 230 (e.g., using an uplink beam or power control parameters set) less than a minimum threshold, the mapping pattern 226 (e.g., uplink beam mapping or power control parameters set mapping) may be adjusted by switching/changing the uplink beam or power control parameters set for at least one resource repetition 228 (e.g., for the last resource repetition 228, or the last N resource repetitions 228 where N is configurable and/or depend on the total number of PUCCH repetitions).

In some examples, for at least one resource repetition 228 which is/are initially mapped to TRP2 (e.g., second uplink beam or second power control parameters set before applying the altering operation 216-2), the first uplink beam or first power control parameters set is used instead. In some examples, the mapping pattern 226 is applied on (or adapted to) the remaining resource repetitions 228 that results from the deferral operation 213 and/or the shifting operation 216-1. In some examples, the deferral operation 213 and/or the shifting operation 216-1 result in reducing the total number of resource repetitions 228 if (i) deferral/shifting for intra-slot PUCCH repetition is only allowed within a slot, or (ii) more generally if there is a configured time window 242 only within which the deferral/shifting mechanism can be done (e.g., a resource repetition 228 cannot be deferred outside the time window 242).

In some examples, the omitting operation 216-3 includes omitting at least one symbol from at least one of a resource repetition 228a or a resource repetition 228b to increase the switching gap to be greater than (or equal to) the switching gap threshold. The number of symbols to be omitted may be defined by an offset period 218. In some examples, the offset period 218 may be specified by the configuration information 214. In some examples, similar to the offset period 218, the number of symbols to be omitted could be part of the PUCCH format configuration, e.g., different PUCCH formats may have different numbers. Alternatively, or additionally, different PUCCH resources may be associated with different numbers of symbols to be omitted. In some examples, different switching gaps (e.g., different offset periods 218) could be associated with different numbers of symbols to be omitted.

In some examples, the omitting operation 216-3 is applied instead of the shifting operation 216-1. In some examples, the user device 204 applies an omitting operation 216-3 and a shifting operation 216-1 to the repetition operation 224, wherein the omitting operation 216-3 may be applied to one or more resource repetitions 228 and the shifting operation 216-1 may be applied to one or more other resource repetitions 228. In some examples, when the existing gap (e.g., due to DL symbols) between the two resource repetitions 228 is not enough to accommodate the gap needed due to beam switching and/or power control parameters set switching (e.g., the gap is less than the switching gap threshold), the omitting operation 216-3 may be applied to the repetition operation 224.

Figure 3:
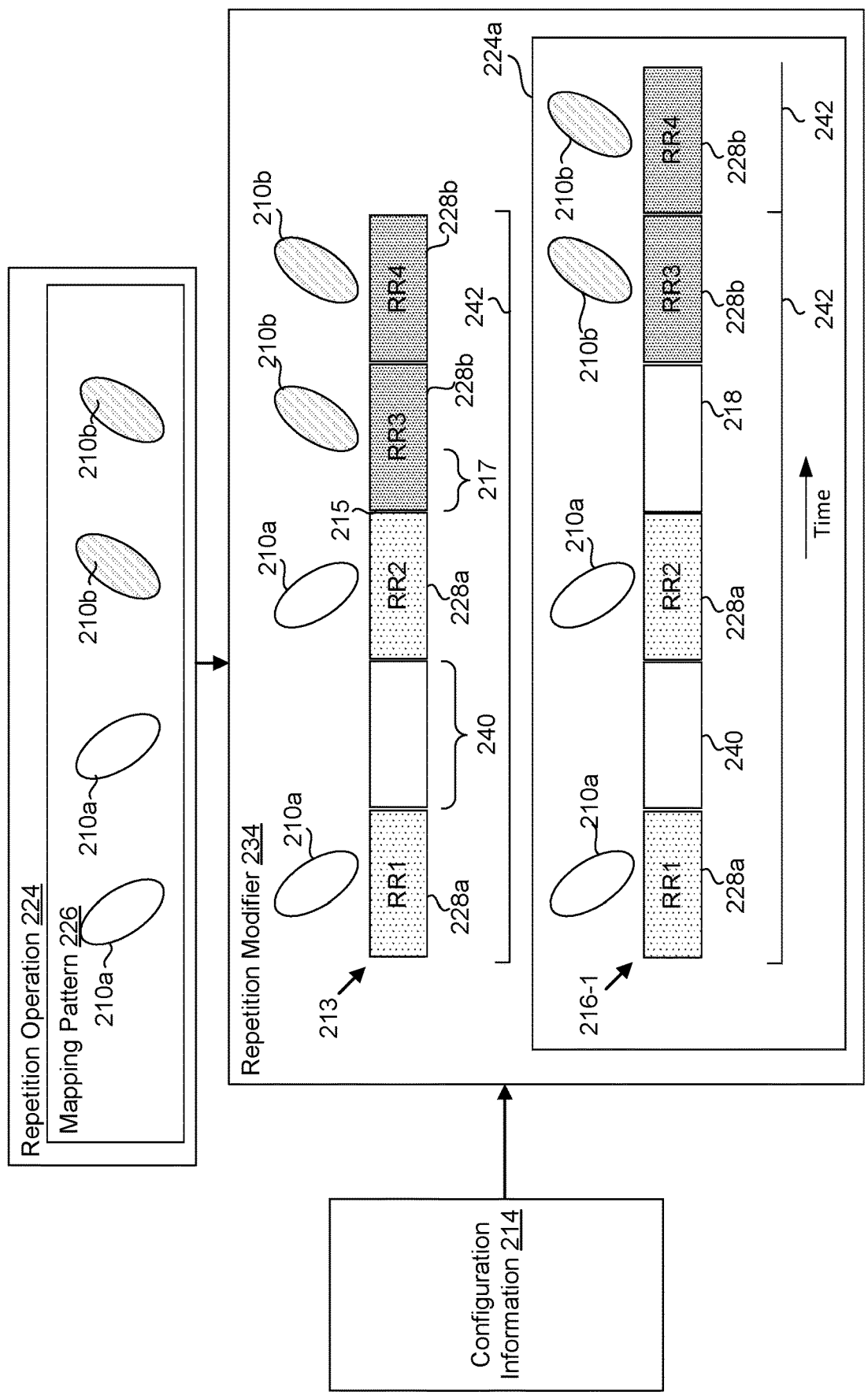
FIG. 3 illustrates a graphical representation of adjusting the repetition operation according to a deferral operation and a shifting operation according to an example implementation.

In some examples, at least one symbol may be only omitted in the second (or subsequent) resource repetition 228 (e.g., resource repetition 228b). In some examples, at least one symbol from each of the resource repetition 228a and the resource repetition 228b may be omitted. In some examples, symbols may be omitted from the two resource repetitions 228 by omitting symbols in an even manner between the resource repetitions 228. In some examples, the omitting operation 216-3 may or may not account for DL symbols 221, and/or flexible symbols (when applicable). In some examples, if the number of symbols left to transmit for a resource repetition 228 is only one or less than a configured number (which may be dependent on the PUCCH format or the type of PUCCH resource), the user device 204 not transmit the resource repetition 228 (e.g., for a resource repetition 228 with a long format (e.g., format 1, 3 or 4)), the user device 204 may drop the resource repetition 228 if the number of symbols left after omitting is less than a threshold number (e.g., 4). In some examples, for a resource repetition 228 for which the number of symbols is reduced due to the omitting operation 216-3, this resource repetition 228 and its content is constructed/generated/mapped based on the reduced number of symbols, FIG. 3 illustrates an example of the repetition modifier 234 configured to apply the deferral operation 213 and the shifting operation 216-1 to the repetition operation 224 to generate a modified repetition operation 224a that accounts for switching gaps 215 (also referred to as gaps 215) and downlink symbols 221.

The mapping pattern 226 includes a sequence of uplink beams, which includes two consecutive uplink beams 210a followed by two consecutive uplink beams 210b. Although the mapping pattern 226 includes a pattern of four, the mapping pattern 226 may be associated with any number of uplink beams such as any number greater than two. As indicated above, the uplink beams 210a are associated with TRP1, and the uplink beams 210b are associated with TR2. Although this figure is described in terms of uplink beams, it is understood that the mapping pattern 226 may recite patterns of different power control parameter sets instead of using uplink beams. Each instance of an uplink beam may represent a resource repetition 228 to be allocated. According to the mapping pattern 226, the repetition operation 224 includes two resource repetitions 228a (e.g., RR1, RR2) associated with uplink beam 210a (and therefore TRP1) and two resource repetitions 228b (e.g., RR1, RR2) associated with uplink beam 210b (and therefore TRP2).

The repetition modifier 234 configured to apply the deferral operation 213 to account for the DL symbols 221. For example, the repetition modifier 234 is configured to shift (or defer) RR2 to a subsequent sub-slot in a time window 242, where the space between RR1 and RR2 is the deferral period 240. For example, the repetition modifier 234 may determine that the 2$^{nd}$ sub-slot overlaps with the transmission of DL symbols 221, and therefore may shift (or defer) the second resource repetition 228a (e.g., RR2) to the subsequent (uplink) sub-slot.

The repetition modifier 234 may determine that a switching gap 215 between resource repetition 228a (e.g., RR2) and resource repetition 228b (e.g., RR3) is less than a switching gap threshold 217, and in response to the switching gap 215 being less than the switching gap threshold 217, the repetition modifier 234 may execute the shifting operation 216 to increase the switching gap 215 to be equal to or greater than the switching gap threshold 217. For example, a certain minimum amount of time may be needed to properly switch from uplink beam 210a to uplink beam 210b (and therefore TRP1 to TRP2), and the minimum amount of time is represented by the switching gap threshold 217. It is noted that a switching gap between RR3 and RR4 being above a switching gap threshold 217 is not needed because RR3 and RR4 are associated with the same uplink beam (and therefore the same TRP). As shown in FIG. 3, the repetition modifier 234 may shift resource repetition 228b (e.g., RR3) by the offset period 218. As shown in FIG. 3, the offset period 218 may be one sub-slot in the time window 242. However, as indicated above, the offset period 218 may be characterized by symbols or slots (not sub-slots). Also, in the example of FIG. 3, the time window 242 is represented by five sub-slots. However, it is noted that the time window 242 may include any number of sub-slots (or slots or even symbols). As such, the shifting of RR3 to the subsequent sub-slot causes RR4 to be allocated in the subsequent time window 242.

Figure 4:
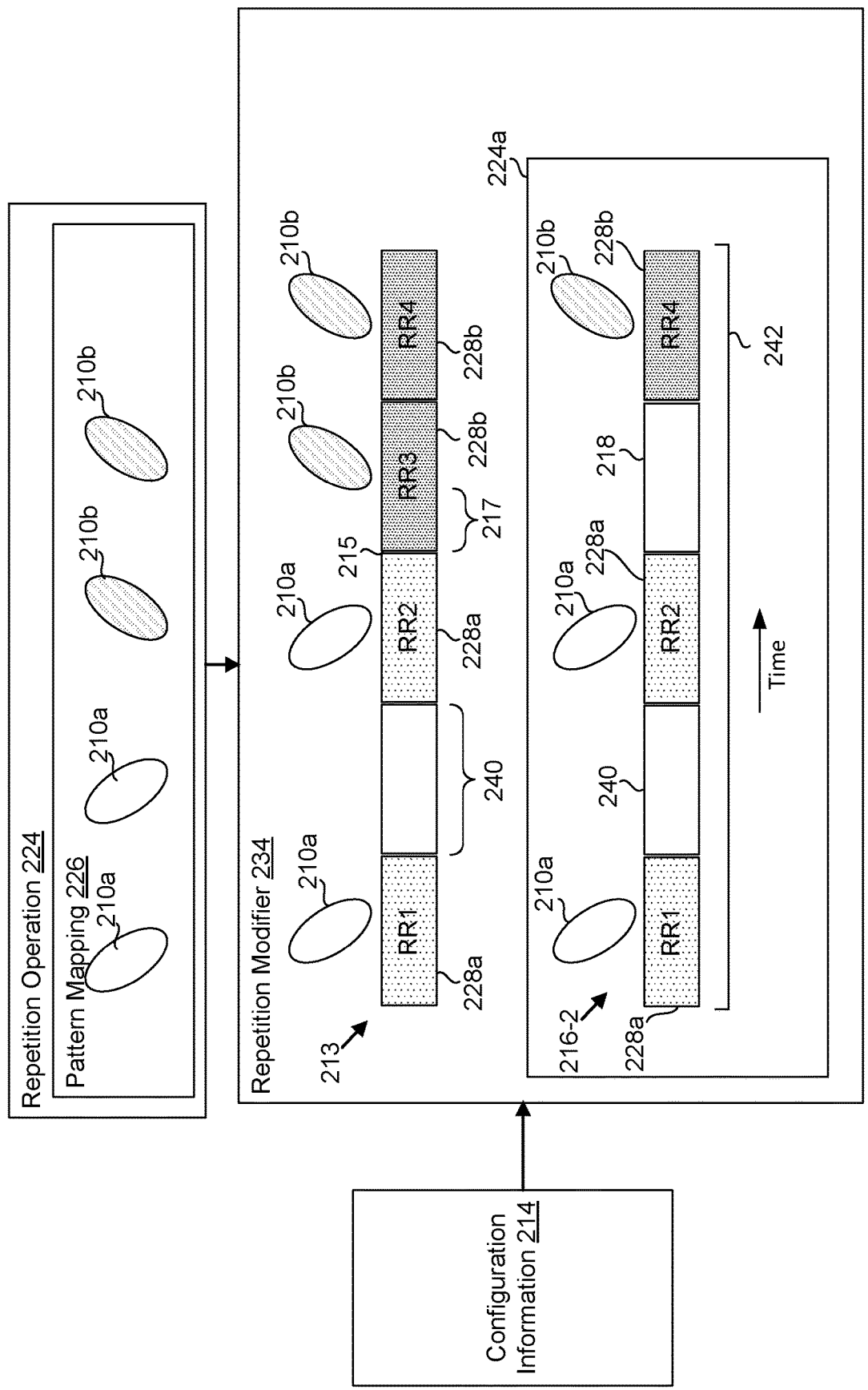
FIG. 4 illustrates a graphical representation of adjusting the repetition operation according to a deferral operation and an altering operation according to an example implementation.

FIG. 4 illustrates an example of the repetition modifier 234 configured to apply the deferral operation 213 and the altering operation 216-2 to the repetition operation 224 to generate a modified repetition operation 224a that accounts for switching gaps 215 and downlink symbols 221. The mapping pattern 226 is the same mapping pattern 226 as described with reference to FIG. 3. The altering operation 216-2 may alter the mapping pattern 226 by discarding resource repetition 228b (e.g., RR3) in order to create a switching gap 215 that is greater than the switching gap threshold 217.

The repetition modifier 234 configured to apply the deferral operation 213 to account for the DL symbols 221. For example, the repetition modifier 234 is configured to shift (or defer) RR2 to a subsequent sub-slot in the time window 242, where the space between RR1 and RR2 is the deferral period 240. For example, the repetition modifier 234 may determine that the 2$^{nd}$ sub-slot overlaps with the transmission of DL symbols 221, and therefore may shift (or defer) the second resource repetition 228a (e.g., RR2) to the subsequent sub-slot.

The repetition modifier 234 may determine that a switching gap 215 between resource repetition 228a (e.g., RR2) and resource 228b (e.g., RR3) is less than a switching gap threshold 217, and in response to the switching gap 215 being less than the switching gap threshold 217, the repetition modifier 234 may execute the altering operation 216-2 to increase the switching gap 215 to be equal to or greater than the switching gap threshold 217. In some examples, in contrast to the example of FIG. 3, a resource repetition 228a may not be allowed to be shifted to a subsequent time window 242. Instead of applying the shifting operation 216-1, the repetition modifier 234 may execute the altering operation 216-2 to adjust the mapping pattern 226 by discarding RR3 to create the sufficient switching gap 215. For example, since a resource repetition 228 cannot be shifted to a subsequent time window 242 and the deferral operation 213 results in the shifting of RR2 to a subsequent sub-slot to account for the DL symbols 221, the repetition modifier 234 is configured to apply the altering operation 216-2 to discard RR3, thereby providing an offset period 218 (e.g., one sub-slot) between RR2 (associated with TRP1) and RR4 (associated with TRP2), where the offset period 218 is greater than the switching gap threshold 217.

Figure 5:
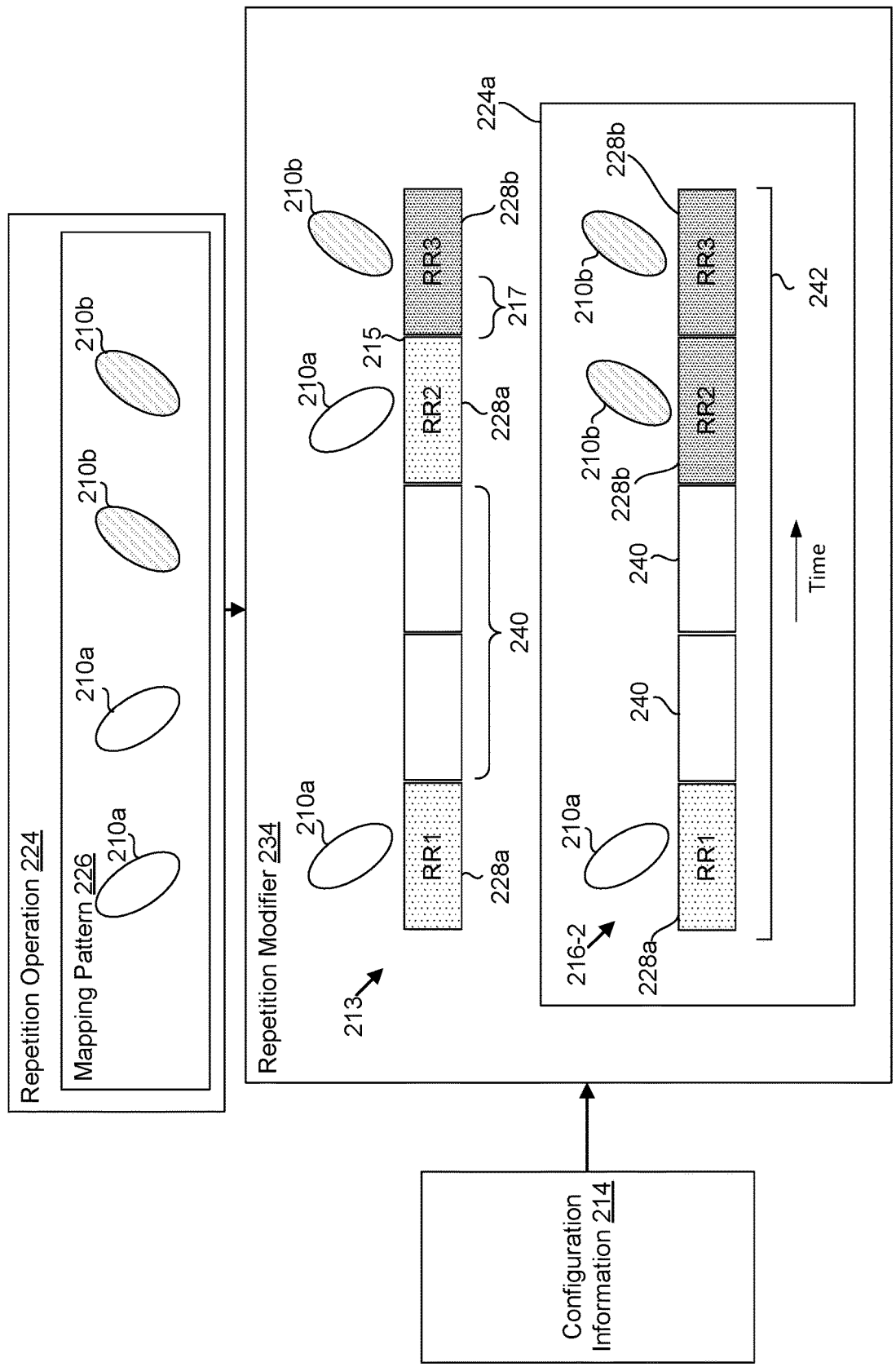
FIG. 5 illustrates a graphical representation of adjusting the repetition operation according to a deferral operation and an altering operation according to another example implementation.

FIG. 5 illustrates an example of the repetition modifier 234 configured to apply the deferral operation 213 and the altering operation 216-2 to the repetition operation 224 to generate a modified repetition operation 224a that accounts for switching gaps 215 and downlink symbols 221. The mapping pattern 226 is the same mapping pattern 226 as described with reference to FIGS. 3 and 4. The altering operation 216-2 may alter the mapping pattern 226 by changing the beam mapping associated with repetition 228a from uplink beam 210a (and TRP1) to now be associated with uplink beam 210b (and TRP2), thereby avoiding a need for a switching gap 215 to be greater than the switching gap threshold 217. For example, since RR2 is now associated with uplink beam 210a (and TRP2) and the subsequent resource repetition 228b (e.g., RR3) is associated with the same uplink beam (and TRP), there may be no requirement for a switching gap 215 to be above the switching gap threshold 217.

The repetition modifier 234 configured to apply the deferral operation 213 to account for the DL symbols 221. For example, the repetition modifier 234 is configured to shift (or defer) RR2 to a sub-slot that is later in the time window 242, where the space between RR1 and RR2 is the deferral period 240. For example, the repetition modifier 234 may determine that the $2^{nd}$ and $3^{rd}$ sub-slots overlap with the transmission of DL symbols 221, and therefore may shift (or defer) the second resource repetition 228a (e.g., RR2) two sub-slots.

The repetition modifier 234 may determine that a switching gap 215 between resource repetition 228a (e.g., RR2) and resource 228b (e.g., RR3) is less than a switching gap threshold 217, and in response to the switching gap 215 being less than the switching gap threshold 217, the repetition modifier 234 may execute the altering operation 216-2 to increase the switching gap 215 to be equal to or greater than the switching gap threshold 217. In some examples, in contrast to the example of FIG. 3, a resource repetition 228a may not be allowed to be shifted to a subsequent time window 242. Instead of applying the shifting operation 216-1, the repetition modifier 234 may execute the altering operation 216-2 to adjust the mapping pattern 226 by changing the beam mapping of RR2. For example, RR2 was originally mapped to uplink beam 210a, but, after applying the altering operation 216-2, RR2 is mapped to uplink beam 210a (and TRP2).

Since a resource repetition 228 cannot be shifted to a subsequent time window 242 and the deferral operation 213 results in the shifting of RR2 to a subsequent sub-slot to account for the DL symbols 221, the repetition modifier 234 is configured to apply the altering operation 216-2 to change the beam mapping of RR2, where the switching gap between RR1 and RR2 is greater than the switching gap threshold 217 due to the deferral period 240, and a switching gap 215 between RR2 and RR3 is not need because they are both mapped to the same uplink beam (and TRP).

Figure 6:
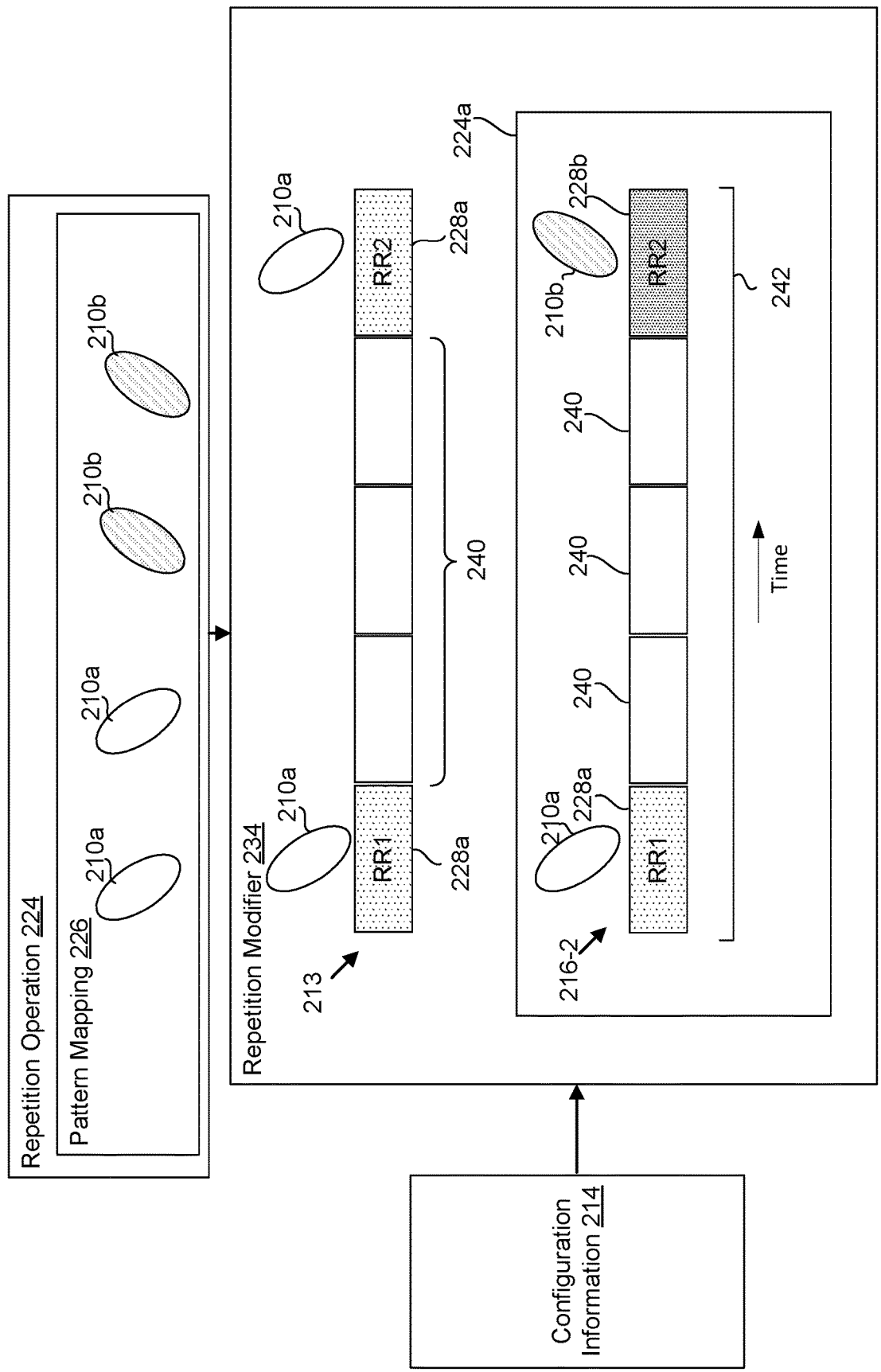
FIG. 6 illustrates a graphical representation of adjusting the repetition operation according to a deferral operation and an altering operation according to another example implementation.

FIG. 6 illustrates an example of the repetition modifier 234 configured to apply the deferral operation 213 and the altering operation 216-2 to the repetition operation 224 to generate a modified repetition operation 224a that accounts for switching gaps 215 and downlink symbols 221. The mapping pattern 226 is the same mapping pattern 226 as described with reference to FIGS. 3, 4, and 5. The altering operation 216-2 may alter the mapping pattern 226 by changing the beam mapping associated with repetition 228a (e.g., RR2) from uplink beam 210a (and TRP1) to now be associated with uplink beam 210b (and TRP2), which provides for beam diversity because the resource repetitions 228 includes repetitions mapped to both uplink beams (and TRPs).

The repetition modifier 234 configured to apply the deferral operation 213 to account for the DL symbols 221. For example, the repetition modifier 234 is configured to shift (or defer) RR2 to a sub-slot that is later in the time window 242, where the space between RR1 and RR2 is the deferral period 240. For example, the repetition modifier 234 may determine that the $2^{nd}$ sub-slot, $3^{rd}$ sub-slot, and $4^{th}$ sub-slot overlaps with the transmission of DL symbols 221, and therefore may shift (or defer) the resource repetition 228a (e.g., RR2) three sub-slots. In the example of FIG. 6, a resource repetition 228 may not be permitted to be allocated to a subsequent time window 242. After the deferral operation 113, the first sub-slot includes resource repetition 228a (e.g., RR1) and the last sub-slot includes resource repetition 228a (e.g., RR1), but the time window 242 does not include any resource repetitions 228b that are mapped to uplink beam 210b (and TRP2).

In order to increase the beam diversity, the repetition modifier 234 applies the altering operation 216-2 to adjust the mapping pattern 226 by changing the beam mapping of RR2. For example, RR2 was originally mapped to uplink beam 210a, but, after applying the altering operation 216-2, RR2 is mapped to uplink beam 210a (and TRP2), and the deferral period 240 introduced by the deferral operation 213 provide a sufficient switching gap between RR1 and RR2.

Figure 7:
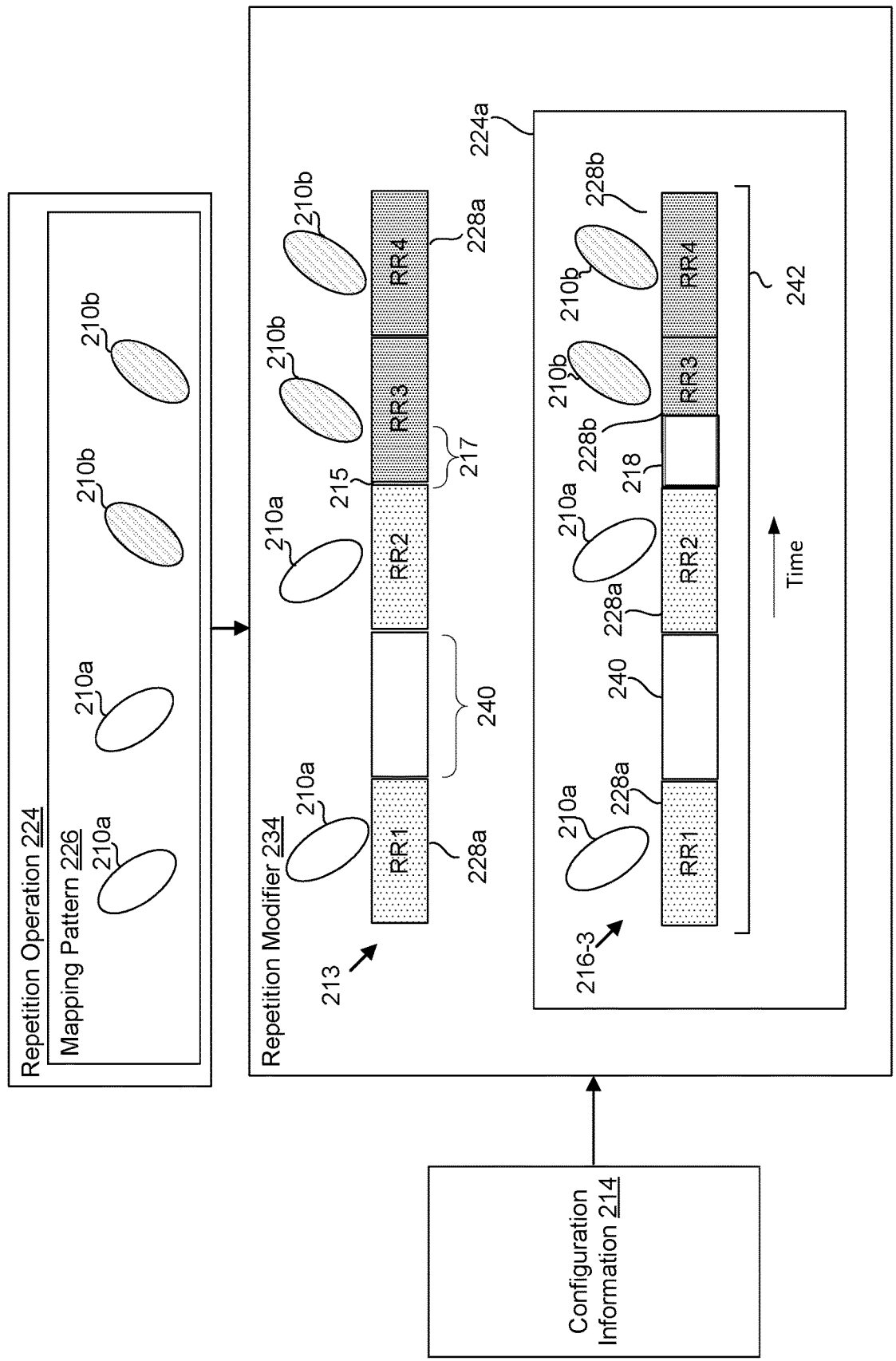
FIG. 7 illustrates a graphical representation of adjusting the repetition operation according to a deferral operation and an omitting operation according to an example implementation.

FIG. 7 illustrates an example of the repetition modifier 234 configured to apply the deferral operation 213 and the omitting operation 216-3 to the repetition operation 224 to generate a modified repetition operation 224a that accounts for switching gaps 215 and downlink symbols 221. The mapping pattern 226 is the same mapping pattern 226 as described with reference to FIGS. 3, 4, 5, and 6. The omitting operation 216 may be configured to omit at least one symbol from RR3 to increase the switching gap 215 to be greater than the switching gap threshold 217. The number of symbols to be omitted may be defined by the offset period 218.

The repetition modifier 234 configured to apply the deferral operation 213 to account for the DL symbols 221. For example, the repetition modifier 234 is configured to shift (or defer) RR2 to a subsequent sub-slot in a time window 242, where the space between RR1 and RR2 is the deferral period 240. For example, the repetition modifier 234 may determine that the $2^{nd}$ sub-slot overlaps with the transmission of DL symbols 221, and therefore may shift (or defer) the resource repetition 228a (e.g., RR2) to the subsequent sub-slot.

The repetition modifier 234 may determine that a switching gap 215 between resource repetition 228a (e.g., RR2) and resource 228b (e.g., RR3) is less than a switching gap threshold 217, and in response to the switching gap 215 being less than the switching gap threshold 217, the repetition modifier 234 may execute the omitting operation 216-3 to increase the switching gap 215 to be equal to or greater than the switching gap threshold 217. For example, the omitting operation 216-3 may discard one or more symbols from RR3, thereby decreasing the length of RR3, and creating an offset period 218. The offset period 218 provides a sufficient gap between RR2 and RR3 that exceeds the switching gap threshold 217.

Figure 8:
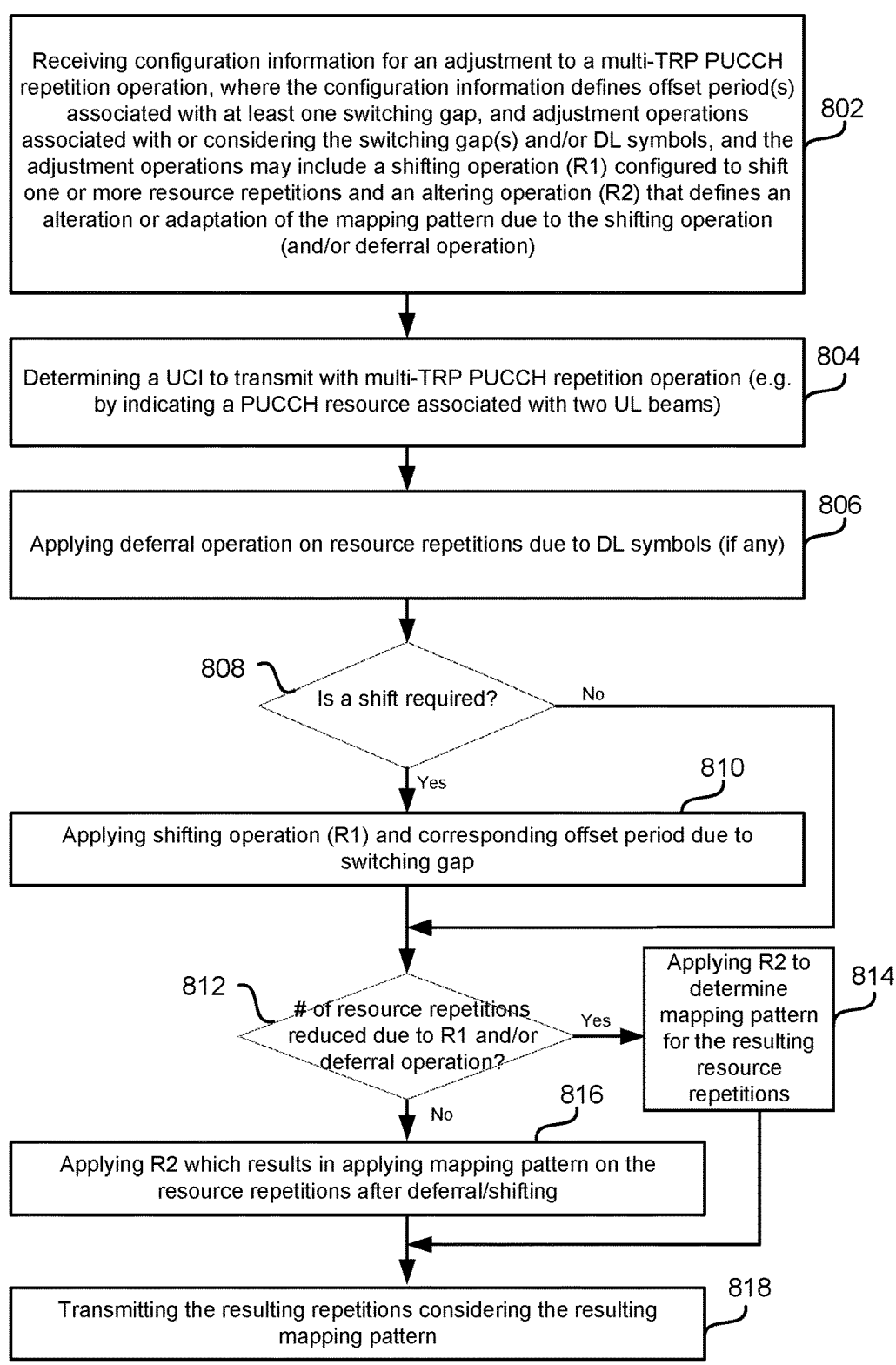
FIG. 8 illustrates a flowchart depicting example operations of a user device for adjusting a multi-TRP repetition operation of uplink control information according to an example implementation.

FIG. 8 illustrates a flowchart 800 depicting example operations of the wireless communication system 200 of FIGS. 2A through 2C. Although the flowchart 800 of FIG. 8 illustrates the operations in sequential order, it will be appreciated that this is merely an example, and that additional or alternative operations may be included. Further, operations of FIG. 8 and related operations may be executed in a different order than that shown, or in a parallel or overlapping fashion. In some examples, the operations of the flowchart 800 are performed by the user device 204.

Operation 802 includes receiving configuration information 214 for an adjustment to a multi-TRP PUCCH repetition operation (e.g., repetition operation 224), where the configuration information 214 defines offset period(s) 218 associated with at least one switching gap 215 (between resource repetitions 228 towards different TRPs), and adjustment operations 216 associated with or considering the switching gap(s) 215 and/or DL symbols 221, and the adjustment operations 214 may include a shifting operation 216-1 (R1) that defines a shifting (deferral) of resource repetitions 228 and an altering operation 216-2 (R2) that defines an alteration or adaptation of the mapping pattern 226 due to the shifting operation 216-1 (R1) and/or deferral operation 213.

Operation 804 includes determining a UCI to transmit with multi-TRP PUCCH repetition operation (e.g., by indicating a PUCCH resource associated with two UL beams). Operation 806 includes applying deferral on PUCCH repetitions due to DL symbols (if any). Operation 808 includes determining whether a shift is required. If yes, the flowchart 800 proceeds to operation 810, and operation 810 includes applying a shifting operation (R1) and corresponding offset period due to switching gap. If no, the flowchart 800 skips operation 810 and proceeds to operation 812. Operation 812 includes determining whether a number of resource repetitions 228 are reduced due to the shifting operation (R1) and/or deferral operation 213. If yes, the flowchart 800 proceeds to operation 814, and operation 814 includes apply R2 to determine the mapping pattern 226 for the resulting resource repetitions. If no, the flowchart 800 proceeds to operation 816, and operation 816 includes applying R2 which results in applying mapping pattern 226 on the resource repetitions 228 after the shifting operation (R1) and/or deferral operation. Operation 818 includes transmitting the resulting repetitions considering the resulting beam mapping.

Figure 9:
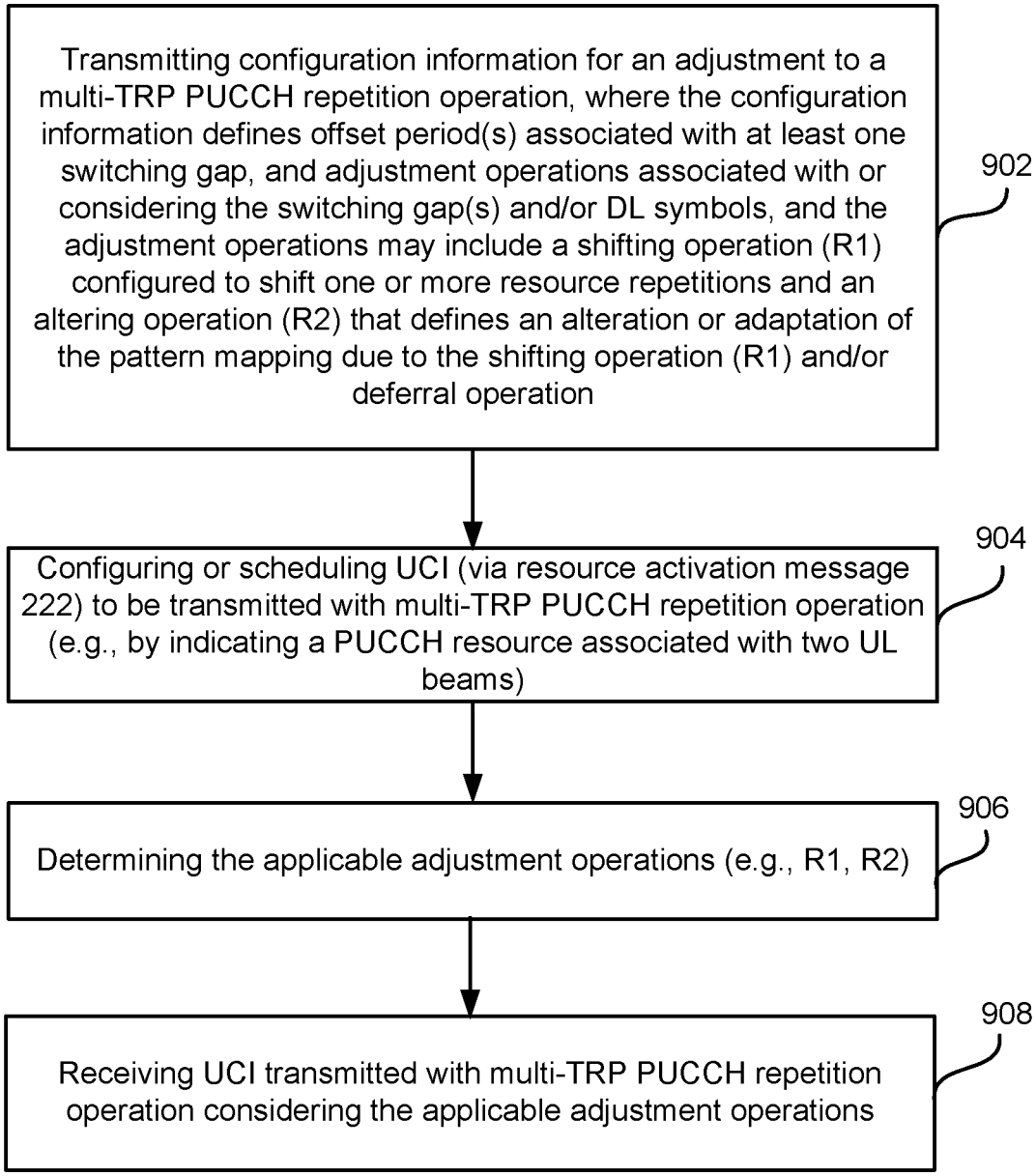
FIG. 9 illustrates a flowchart depicting example operations of a base station for adjusting a multi-TRP repetition operation of uplink control information according to an example implementation.

FIG. 9 illustrates a flowchart 900 depicting example operations of the wireless communication system 200 of FIGS. 2A through 2C. Although the flowchart 900 of FIG. 9 illustrates the operations in sequential order, it will be appreciated that this is merely an example, and that additional or alternative operations may be included. Further, operations of FIG. 9 and related operations may be executed in a different order than that shown, or in a parallel or overlapping fashion. In some examples, the operations of the flowchart 900 are performed by the base station 202.

Operation 902 includes transmitting configuration information 214 for an adjustment to a multi-TRP PUCCH repetition operation (e.g., repetition operation 224), where the configuration information 214 defines offset period(s) 218 associated with at least one switching gap 215 (between resource repetitions 228 towards different TRPs), and adjustment operations 216 associated with or considering the switching gap(s) 215 and/or DL symbols 221, and the adjustment operations 214 may include a shifting operation 216-1 (R1) that defines a shifting (deferral) of resource repetitions 228 and an altering operation 216-2 (R2) that defines an alteration or adaptation of the mapping pattern 226 due to the shifting operation (R1) and/or deferral operation 213.

Operation 904 includes configuring or scheduling UCI (via resource activation message 222) to be transmitted with multi-TRP PUCCH repetition operation (e.g., by indicating a PUCCH resource associated with two UL beams). Operation 906 includes determining the applicable adjustment operations (e.g., R1, R2). Operation 908 includes receiving UCI transmitted with multi-TRP PUCCH repetition operation considering the applicable adjustment operations.

Figure 10:
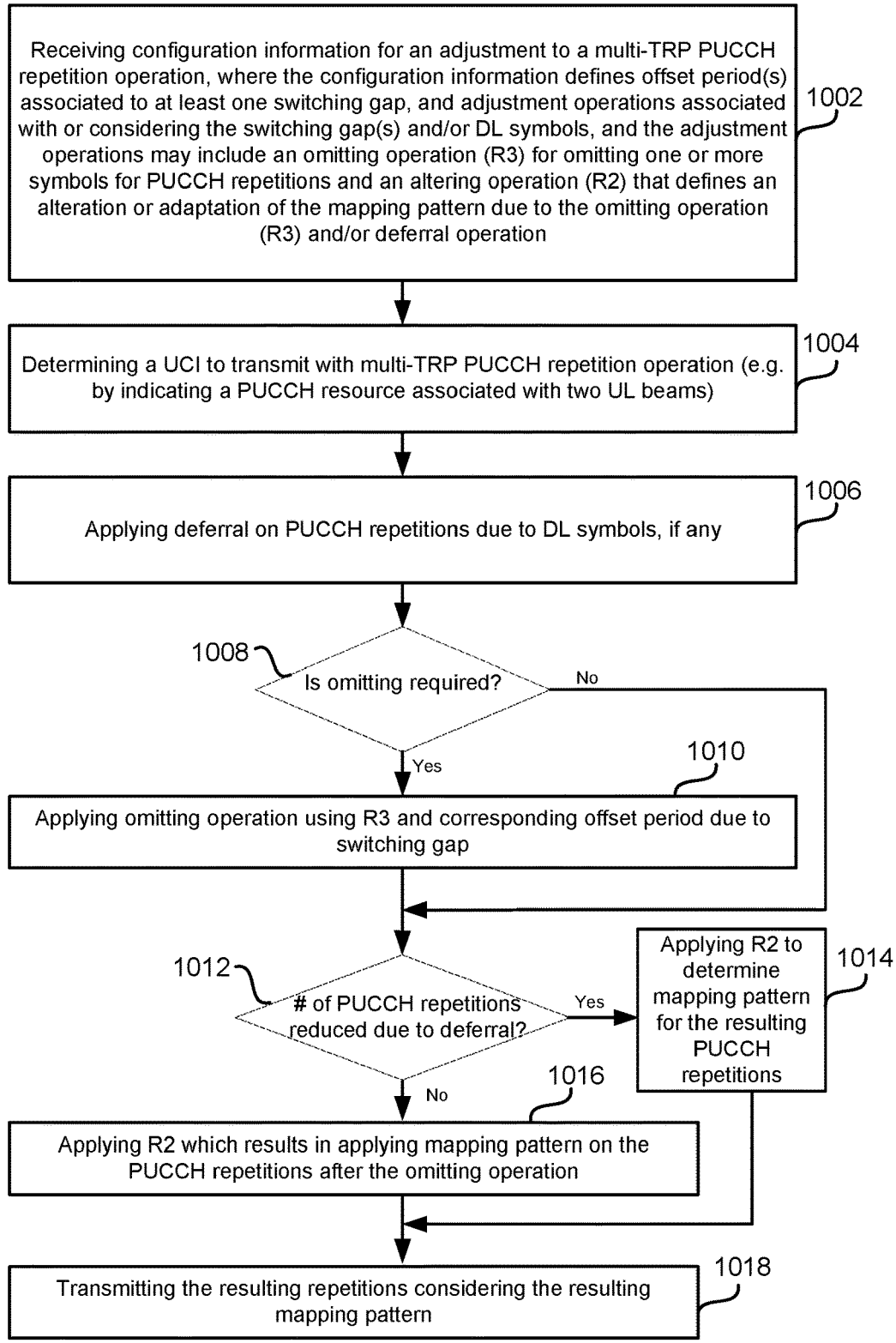
FIG. 10 illustrates a flowchart depicting example operations of a user device for adjusting a multi-TRP repetition operation of uplink control information according to another example implementation.

FIG. 10 illustrates a flowchart 1000 depicting example operations of the wireless communication system 200 of FIGS. 2A through 2C. Although the flowchart 1000 of FIG. 10 illustrates the operations in sequential order, it will be appreciated that this is merely an example, and that additional or alternative operations may be included. Further, operations of FIG. 10 and related operations may be executed in a different order than that shown, or in a parallel or overlapping fashion. In some examples, the operations of the flowchart 1000 are performed by the user device 204.

Operation 1002 includes receiving configuration information 214 for an adjustment to a multi-TRP PUCCH repetition operation (e.g., repetition operation 224), where the configuration information 214 defines offset period(s) 218 associated with at least one switching gap 215 (between resource repetitions 228 towards different TRPs), and adjustment operations 216 associated with or considering the switching gap(s) 215 and/or DL symbols 221, and the adjustment operations 214 may include an omitting operation 216-3 (R3) that omits one or more symbols of one or more resource repetitions 228 and an altering operation 216-2 (R2) that defines an alteration or adaptation of the mapping pattern 226 due the omitting operation (R1) and/or deferral operation 213.

Operation 1004 includes determining a UCI to transmit with multi-TRP PUCCH repetition operation (e.g., by indicating a PUCCH resource associated with two UL beams). Operation 1006 includes applying deferral on PUCCH repetitions due to DL symbols (if any). Operation 1008 includes determining whether omitting is required. If yes, the flowchart 1000 proceeds to operation 1010, and operation 1010 includes applying the omitting operation 216-3 (R3) and corresponding offset period 218 due to switching gap. If no, the flowchart 1000 skips operation 1010 and proceeds to operation 1012. Operation 1012 includes determining whether a number of resource repetitions 228 are reduced due to the omitting operation 216-3 (R3). If yes, the flowchart 1000 proceeds to operation 1014, and operation 1014 includes applying R2 to determine the mapping pattern 226 for the resulting resource repetitions 228. If no, the flowchart 1000 proceeds to operation 1016, and operation 1016 includes applying R2 which results in applying mapping pattern 226 on the resource repetitions after the omitting operation 216-3 (R3). Operation 1018 includes transmitting the resulting repetitions considering the resulting beam mapping.

Figure 11:
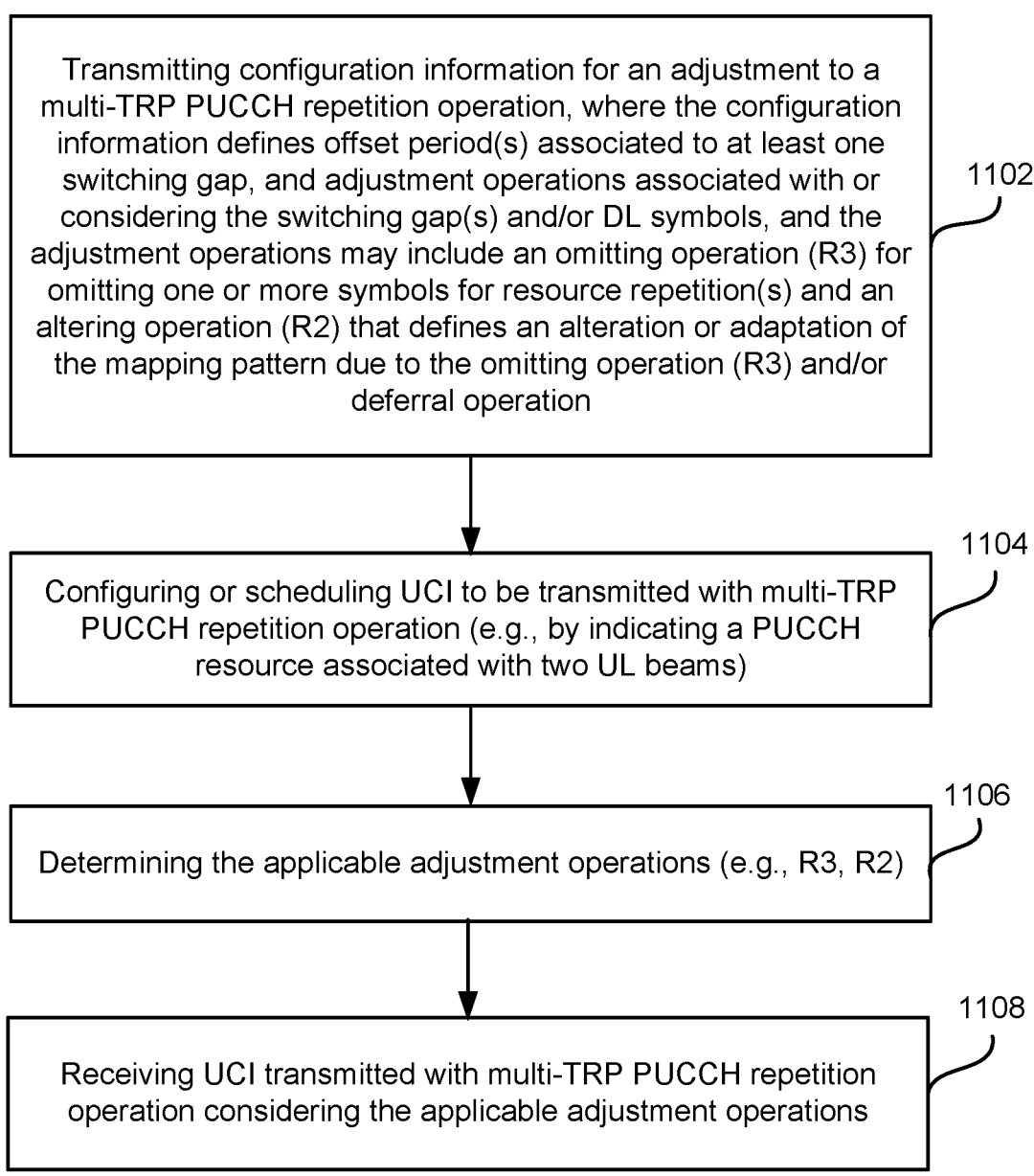
FIG. 11 illustrates a flowchart depicting example operations of a base station for adjusting a multi-TRP repetition operation of uplink control information according to another example implementation.

FIG. 11 illustrates a flowchart 1100 depicting example operations of the wireless communication system 200 of FIGS. 2A through 2C. Although the flowchart 1100 of FIG. 11 illustrates the operations in sequential order, it will be appreciated that this is merely an example, and that additional or alternative operations may be included. Further, operations of FIG. 11 and related operations may be executed in a different order than that shown, or in a parallel or overlapping fashion. In some examples, the operations of the flowchart 1100 are performed by the base station 202.

Operation 1102 includes transmitting configuration information 214 for an adjustment to a multi-TRP PUCCH repetition operation (e.g., repetition operation 224), where the configuration information 214 defines offset period(s) 218 associated with at least one switching gap 215 (between resource repetitions 228 towards different TRPs), and adjustment operations 216 associated with or considering the switching gap(s) 215 and/or DL symbols 221, and the adjustment operations 214 may include an omitting operation 216-3 (R3) that omits one or more symbols of one or more resource repetitions 228 and an altering operation 216-2 (R2) that defines an alteration or adaptation of the mapping pattern 226 due the omitting operation (R1) and/or deferral operation 213.

Operation 1104 includes configuring or scheduling UCI (via resource activation message 222) to be transmitted with multi-TRP PUCCH repetition operation (e.g., by indicating a PUCCH resource associated with two UL beams). Operation 1106 includes determining the applicable adjustment operations (e.g., R3, R2). Operation 1108 includes receiving UCI transmitted with multi-TRP PUCCH repetition operation considering the applicable adjustment operations.

Figure 12:
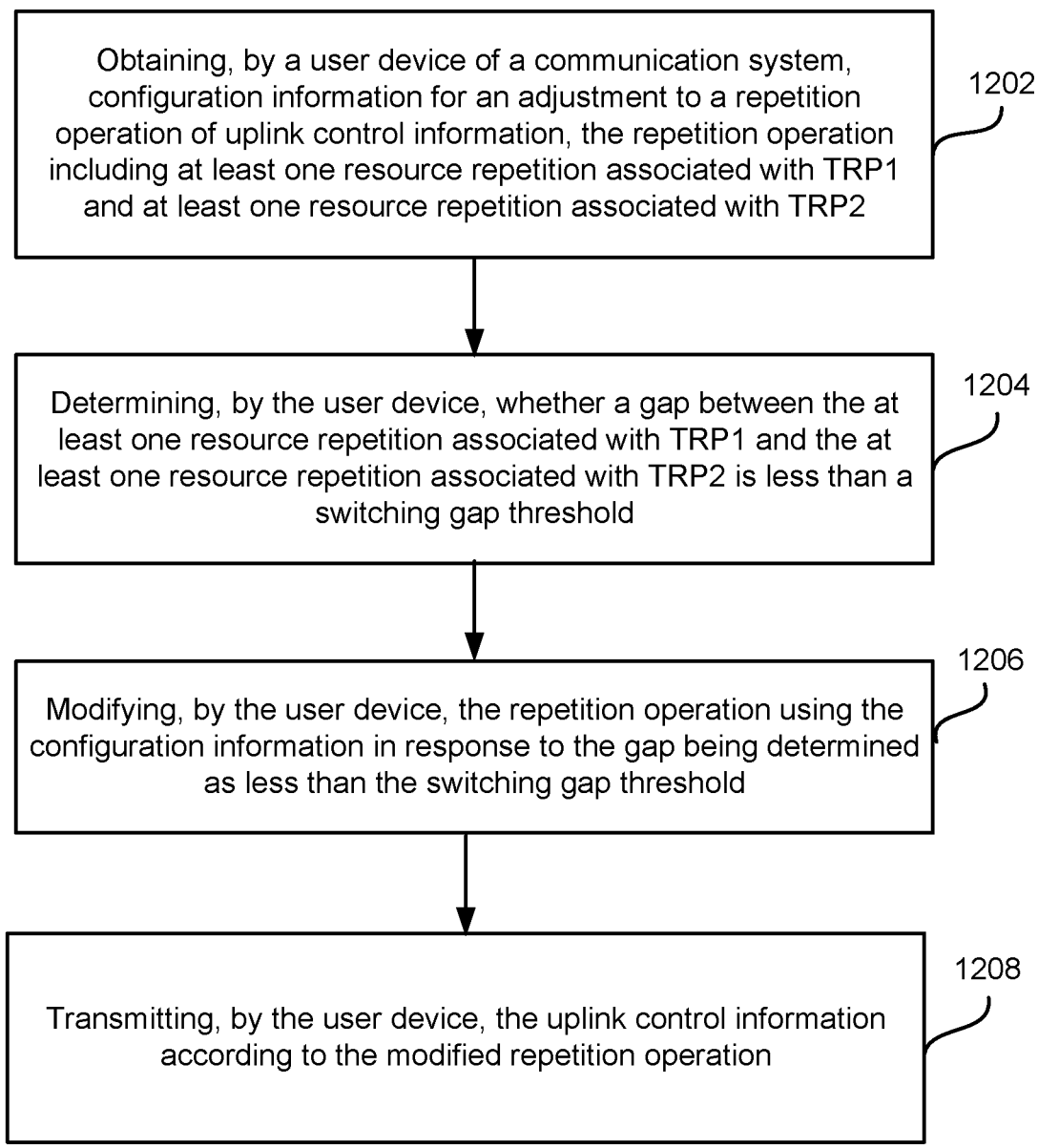
FIG. 12 illustrates a flowchart depicting example operations of a user device for adjusting a multi-TRP repetition operation of uplink control information according to another example implementation.

FIG. 12 illustrates a flowchart 1200 depicting example operations of the wireless communication system 200 of FIGS. 2A through 2C. Although the flowchart 1200 of FIG. 12 illustrates the operations in sequential order, it will be appreciated that this is merely an example, and that additional or alternative operations may be included. Further, operations of FIG. 12 and related operations may be executed in a different order than that shown, or in a parallel or overlapping fashion. In some examples, the operations of the flowchart 1200 are performed by the user device 204.

Operation 1202 includes obtaining, by a user device 204 of a communication system 200, configuration information 214 for an adjustment to a repetition operation 224 of uplink control information 232 on a physical uplink control channel 205, the repetition operation including at least one resource repetition 228a associated with a TRP1 and at least one resource repetition 228b associated with a TRP2.

Operation 1204 includes determining, by the user device, whether a gap 215 between the at least one resource repetition 228a associated with TRP1 and the at least one resource repetition 228b associated with TRP2 is less than a switching gap threshold 217. The at least one resource repetition 228a and the at least one resource repetition 228b are consecutive resource repetitions. Operation 1206 includes modifying, by the user device, the repetition operation 224 using the configuration information 214 in response to the gap 215 being determined as less than the switching gap threshold 217. Operation 1208 includes transmitting, by the user device, the uplink control information 232 according to the modified repetition operation 224a.

Figure 13:
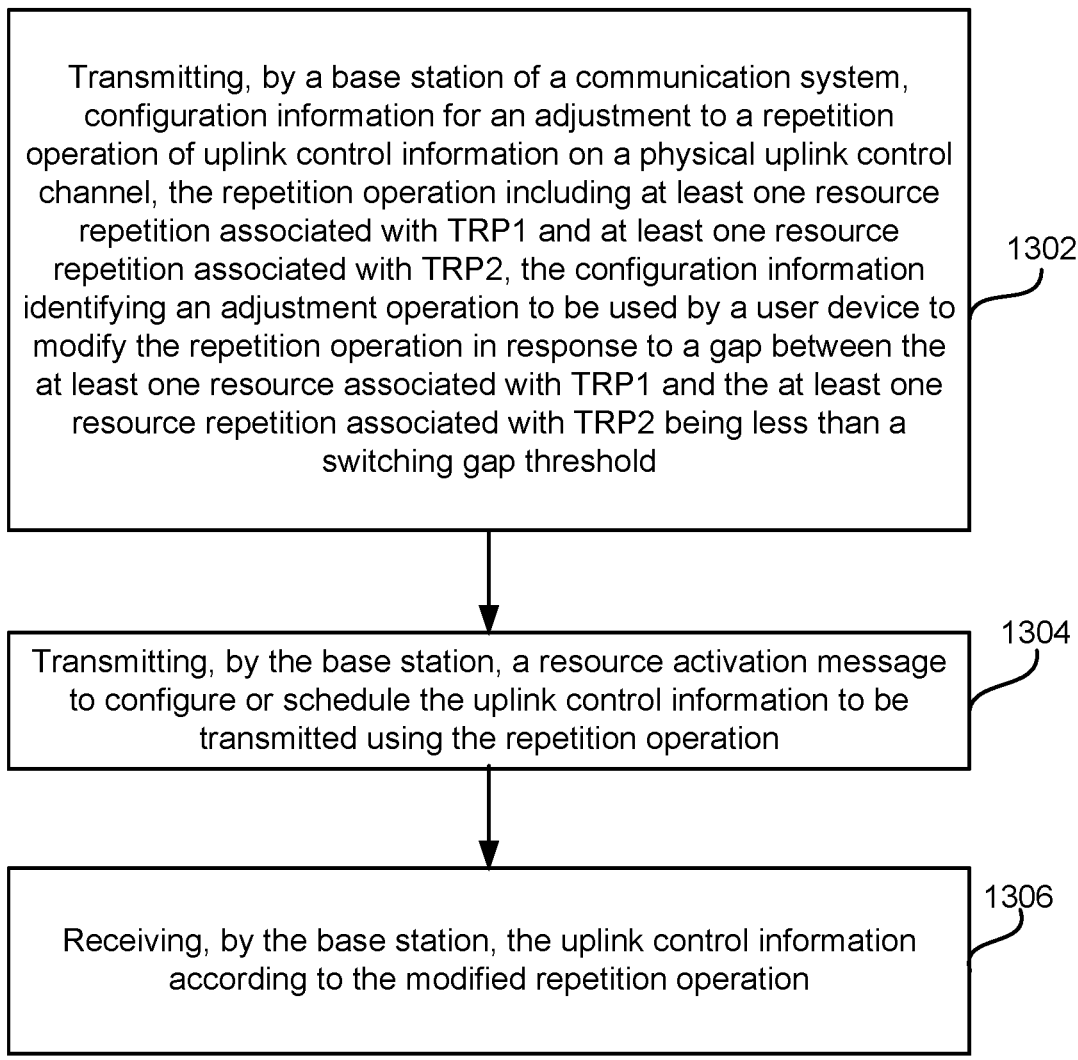
FIG. 13 illustrates a flowchart depicting example operations of a base station for adjusting a multi-TRP repetition operation of uplink control information according to another example implementation.

FIG. 13 illustrates a flowchart 1300 depicting example operations of the wireless communication system 200 of FIGS. 2A through 2C. Although the flowchart 1300 of FIG. 13 illustrates the operations in sequential order, it will be appreciated that this is merely an example, and that additional or alternative operations may be included. Further, operations of FIG. 13 and related operations may be executed in a different order than that shown, or in a parallel or overlapping fashion. In some examples, the operations of the flowchart 1200 are performed by the base station 202.

Operation 1302 includes transmitting, by a base station 202 of a communication system 200, configuration information 214 for an adjustment to a repetition operation 224 of uplink control information 232 on a physical uplink control channel 205, where the repetition operation 224 includes at least one resource repetition 228 associated with a TRP1 and at least one resource repetition 228b associated with a TRP2. The configuration information 214 identifying an adjustment operation 216 to be used by a user device 204 to modify the repetition operation 224 in response to a gap 215 between the at least one resource repetition 228a associated with TRP1 and the at least one resource repetition 228b associated with TRP2 being less than a switching gap threshold 217. The at least one resource repetition 228a and the at least one resource repetition 228b are consecutive resource repetitions.

Operation 1304 includes transmitting, by the base station 202, a resource activation message 222 to configure or schedule the uplink control information 232 to be transmitted using the repetition operation 224. Operation 1306 includes receiving, by the base station 202, the uplink control information 232 according to the modified repetition operation 224a.

Example 1. A method comprising: obtaining, by a user device of a communication system, configuration information for an adjustment to a repetition operation of uplink control information on a physical uplink control channel, the repetition operation including a plurality of resource repetitions, the plurality of resource repetitions including consecutive resource repetitions; determining, by the user device, whether a gap between the consecutive resource repetitions is less than a switching gap threshold, the consecutive resource repetitions including at least one resource repetition associated with the first transmission-reception-point (TRP) and at least one resource repetition associated with the second TRP; modifying, by the user device, the repetition operation using the configuration information in response to the gap being determined as less than the switching gap threshold; and transmitting, by the user device, the uplink control information according to the modified repetition operation.

Example 2. The method of Example 1, further comprising: executing a deferral operation to account for one or more downlink symbols in the repetition operation, the deferral operation configured to move at least one resource repetition of the plurality of resource repetitions from a first time location to a second time location in a time window or a subsequent time window.

Example 3. The method of any of Examples 1 through 2, wherein the modifying the repetition operation includes increasing the gap to be equal to or greater than the switching gap threshold.

Example 4. The method of any of Examples 1 through 3, wherein the modifying the repetition operation includes executing a shifting operation on the at least one resource repetition associated with the second TRP such that the at least one resource repetition associated with the second TRP is shifted by an offset period to a time that is later in a time window or a subsequent time window.

Example 5. The method of any of Examples 1 through 4, wherein the offset period has a first offset value when a format of the physical uplink control channel is a first type and the offset value has a second offset value when the format of the physical uplink control channel is a second type, the method further comprising: determining that the format of the physical uplink control channel is the second type; and selecting the second offset value for the shifting operation.

Example 6. The method of any of Examples 1 through 5, wherein the offset period has a first offset value when the physical uplink control channel is a first type of uplink resource and the offset value has a second offset value when the physical uplink control channel is a second type of uplink resource.

Example 7. The method of any of Examples 1 through 6, further comprising: determining that at least one of a shifting operation or a deferral operation causes a number of resource repetitions associated with the first TRP within the time window to be less than a threshold level; and re-mapping the at least one resource repetition that is originally associated with the second TRP to be associated with the first TRP.

Example 8. The method of any of Examples 1 through 7, further comprising: determining that at least one of a shifting operation or a deferral operation causes at least one resource repetition of the plurality of resource repetitions to not fit within a time window; and discarding the least one resource repetition from the repetition operation.

Example 9. The method of any of Examples 1 through 8, wherein the modifying the repetition operation includes omitting at least one symbol from at least one of the at least one resource repetition associated with the first TRP or the at least one resource repetition associated with the second TRP.

Example 10. The method of any of Examples 1 through 9, wherein the modifying the repetition operation includes re-mapping the at least one resource repetition associated with the first TRP to be associated with the second TRP or the at least one resource repetition associated with the second TRP to be associated with the first TRP.

Example 11. The method of any of Examples 1 through 10, wherein the configuration information is received over a network from a base station.

Example 12. An apparatus comprising: at least one processor; and at least one memory including computer program code, the at least one memory and the computer program code configured to, with the at least one processor, cause the apparatus to obtain configuration information for an adjustment to a repetition operation of uplink control information on a physical uplink control channel, the repetition operation defining a number of resource repetitions towards multiple transmission-reception-point (TRP); insert a deferral period to account for one or more downlink symbols within a time window of the repetition operation; determine whether a gap between consecutive resource repetitions is less than a switching gap threshold, the consecutive resource repetitions including a first resource repetition associated with a first TRP and a second resource repetition associated with a second TRP; modify the repetition operation using the configuration information in response to the gap being determined as less than the switching gap threshold such that the gap is increased to be to equal or greater than the switching gap threshold; and transmit the uplink control information according to the modified repetition operation.

Example 13. The apparatus of Example 12, wherein the at least one memory and the computer program code are configured to, with the at least one processor, cause the apparatus to: execute a shifting operation on the second resource repetition such that the second resource repetition is shifted by an offset period to a time that is later in the time window or a subsequent time window.

Example 14. The apparatus of any of Examples 12 through 13, wherein the increased gap includes the deferral period.

Example 15. The apparatus of any of Examples 12 through 13, wherein the increased gap does not include the deferral period.

Example 16. The apparatus of any of Examples 12 through 15, wherein the at least one memory and the computer program code are configured to, with the at least one processor, cause the apparatus to determine that to at least one of a deferral operation or a shifting operation causes a number of resource repetitions associated with the first TRP within the time window to be less than a threshold level; and re-mapping a resource repetition that is originally associated with the second TRP to be associated with the first TRP.

Example 17. The apparatus of any of Examples 12 through 16, wherein the at least one memory and the computer program code are configured to, with the at least one processor, cause the apparatus to determine that at least one of a deferral operation or a shifting operation causes a third resource repetition to not fit within a time window; and discard the third resource repetition from the repetition operation.

Example 18. An apparatus comprising: means for obtaining configuration information for an adjustment to a repetition operation of uplink control information on a physical uplink control channel, the repetition operation including a plurality of resource repetitions, the plurality of resource repetitions including consecutive resource repetitions; means for determining whether a gap between the consecutive resource repetitions is less than a switching gap threshold, the consecutive resource repetitions including at least one resource repetition associated with the first transmission-reception-point (TRP) and at least one resource repetition associated with the second TRP; means for modifying the repetition operation using the configuration information in response to the gap being determined as less than the switching gap threshold; and means for transmitting, by the user device, the uplink control information according to the modified repetition operation.

Example 19. The apparatus of Example 18, further comprising: means for executing a deferral operation to account for one or more downlink symbols in the repetition operation, the deferral operation configured to move at least one resource repetition of the plurality of resource repetitions from a first time location to a second time location in a time window or a subsequent time window.

Example 20. The apparatus of any of Examples 18 through 19, wherein the means for modifying the repetition operation includes means for increasing the gap to be equal to or greater than the switching gap threshold.

Example 21. The apparatus of any of Examples 18 through 20, wherein the means for modifying the repetition operation includes means for executing a shifting operation on the at least one resource repetition associated with the second TRP such that the at least one resource repetition associated with the second TRP is shifted by an offset period to a time that is later in a time window or a subsequent time window.

Example 22. The apparatus of any of Examples 18 through 21, wherein the offset period has a first offset value when a format of the physical uplink control channel is a first type and the offset value has a second offset value when the format of the physical uplink control channel is a second type, the apparatus further comprising means for determining that the format of the physical uplink control channel is the second type; and means for selecting the second offset value for the shifting operation.

Example 23. The apparatus of any of Examples 18 through 22, wherein the offset period has a first offset value when the physical uplink control channel is a first type of uplink resource and the offset value has a second offset value when the physical uplink control channel is a second type of uplink resource.

Example 24. The apparatus of any of Examples 18 through 23, further comprising: means for determining that at least one of a shifting operation or a deferral operation causes a number of resource repetitions associated with the first TRP within the time window to be less than a threshold level; and means for re-mapping the at least one resource repetition that is originally associated with the second TRP to be associated with the first TRP.

Example 25. The apparatus of any of Examples 18 through 24, further comprising: means for determining that at least one of a shifting operation or a deferral operation causes at least one resource repetition of the plurality of resource repetitions to not fit within a time window; and means for discarding the least one resource repetition from the repetition operation.

Example 26. The apparatus of any of Examples 18 through 25, wherein the means for modifying the repetition operation includes means for omitting at least one symbol from at least one of the at least one resource repetition associated with the first TRP or the at least one resource repetition associated with the second TRP.

Example 27. The apparatus of any of Examples 18 through 26, wherein the means for modifying the repetition operation includes means for re-mapping the at least one resource repetition associated with the first TRP to be associated with the second TRP or the at least one resource repetition associated with the second TRP to be associated with the first TRP.

Example 28. The apparatus of any of Examples 18 through 26, wherein the configuration information is received over a network from a base station.

Example 29. A computer program product comprising a non-transitory computer-readable medium storing executable instructions that when executed by at least one processor cause the at least one processor to obtain configuration information for an adjustment to a repetition operation of uplink control information on a physical uplink control channel, the repetition operation including a plurality of resource repetitions, the plurality of resource repetitions including consecutive resource repetitions; determine whether a gap between the consecutive resource repetitions is less than a switching gap threshold, the consecutive resource repetitions including at least one resource repetition associated with the first transmission-reception-point (TRP) and at least one resource repetition associated with the second TRP; modify the repetition operation using the configuration information in response to the gap being determined as less than the switching gap threshold; and transmit the uplink control information according to the modified repetition operation.

Example 30. The computer program product of Example 39, wherein the executable instructions include instructions that when executed by the at least one processor cause the at least one processor to execute a deferral operation to account for one or more downlink symbols in the repetition operation, the deferral operation configured to move at least one resource repetition of the plurality of resource repetitions from a first time location to a second time location in a time window or a subsequent time window.

Example 31. The computer program product of any of Examples 29 through 30, wherein the executable instructions include instructions that when executed by the at least one processor cause the at least one processor to increase the gap to be equal to or greater than the switching gap threshold.

Example 32. The computer program product of any of Examples 29 through 31, wherein the executable instructions include instructions that when executed by the at least one processor cause the at least one processor to execute a shifting operation on the at least one resource repetition associated with the second TRP such that the at least one resource repetition associated with the second TRP is shifted by an offset period to a time that is later in a time window or a subsequent time window.

Example 33. The computer program product of any of Examples 29 through 32, wherein the offset period has a first offset value when a format of the physical uplink control channel is a first type and the offset value has a second offset value when the format of the physical uplink control channel is a second type, wherein the executable instructions include instructions that when executed by the at least one processor cause the at least one processor to determine that the format of the physical uplink control channel is the second type; and selecting the second offset value for the shifting operation.

Example 34. The computer program product of any of Examples 29 through 33, wherein the offset period has a first offset value when the physical uplink control channel is a first type of uplink resource and the offset value has a second offset value when the physical uplink control channel is a second type of uplink resource.

Example 35. The computer program product of any of Examples 29 through 34, wherein the executable instructions include instructions that when executed by the at least one processor cause the at least one processor to determine that at least one of a shifting operation or a deferral operation causes a number of resource repetitions associated with the first TRP within the time window to be less than a threshold level; and re-map the at least one resource repetition that is originally associated with the second TRP to be associated with the first TRP.

Example 36. The computer program product of any of Examples 29 through 35, wherein the executable instructions include instructions that when executed by the at least one processor cause the at least one processor to determine that at least one of a shifting operation or a deferral operation causes at least one resource repetition of the plurality of resource repetitions to not fit within a time window; and discard the least one resource repetition from the repetition operation.

Example 37. The computer program product of any of Examples 29 through 36, wherein the executable instructions include instructions that when executed by the at least one processor cause the at least one processor to omit at least one symbol from at least one of the at least one resource repetition associated with the first TRP or the at least one resource repetition associated with the second TRP.

Example 38. The computer program product of any of Examples 29 through 37, wherein the executable instructions include instructions that when executed by the at least one processor cause the at least one processor to re-map the at least one resource repetition associated with the first TRP to be associated with the second TRP or the at least one resource repetition associated with the second TRP to be associated with the first TRP.

Example 39. The computer program product of any of Examples 29 through 38, wherein the configuration information is received over a network from a base station.

Example 40. A computer program product comprising a non-transitory computer-readable medium storing executable instructions that when executed by at least one processor cause the at least one processor to transmit, by a base station of a communication system, configuration information for an adjustment to a repetition operation of uplink control information on a physical uplink control channel, the repetition operation including at least one resource repetition associated with a first transmission-reception-point (TRP) and at least one resource repetition associated with a second TRP, the configuration information identifying an adjustment operation to be used by a user device to modify the repetition operation in response to a gap between the at least one resource repetition associated with the first TRP and the at least one resource repetition associated with the second TRP being less than a switching gap threshold; transmit, by the base station, a resource activation message to configure or schedule the uplink control information to be transmitted using the repetition operation; and receive, by the base station, the uplink control information according to the modified repetition operation.

Example 41. The computer program product of Example 40, wherein the adjustment operation includes a shifting operation configured to shift the at least one resource repetition associated with the second TRP by an offset period to a time that is later in a time window or a subsequent time window such that the gap is greater than the switching gap threshold.

Example 42. The computer program product of any of Examples 40 through 41, wherein the at least one resource repetition associated with the second TRP includes a first resource repetition and a second resource repetition, wherein the adjustment operation includes an altering operation configured to discard the second resource repetition from the repetition operation such that the gap is greater than the switching gap threshold.

Example 43. The computer program product of any of Examples 40 through 42, wherein the at least one resource repetition associated with the first TRP includes a first resource repetition and a second resource repetition, wherein the at least one resource repetition associated with the second TRP includes a third resource repetition, wherein the adjustment operation includes a deferral operation configured to insert a deferral period to account for one or more downlink symbols between the first resource repetition and the second resource repetition and an altering operation configured to re-map the second resource repetition that is originally associated with the first TRP to be associated with the second TRP.

Example 44. The computer program product of any of Examples 40 through 43, wherein the adjustment operation includes an omitting operation configured to omit at least one symbol from at least one of the at least one resource repetition associated with the first TRP or the at least one resource repetition associated with the second TRP.

Example 45. An apparatus comprising a non-transitory computer-readable medium storing executable instructions that when executed by at least one processor cause the at least one processor to transmit, by a base station of a communication system, configuration information for an adjustment to a repetition operation of uplink control information on a physical uplink control channel, the repetition operation including at least one resource repetition associated with a first transmission-reception-point (TRP) and at least one resource repetition associated with a second TRP, the configuration information identifying an adjustment operation to be used by a user device to modify the repetition operation in response to a gap between the at least one resource repetition associated with the first TRP and the at least one resource repetition associated with the second TRP being less than a switching gap threshold; transmit, by the base station, a resource activation message to configure or schedule the uplink control information to be transmitted using the repetition operation; and receive, by the base station, the uplink control information according to the modified repetition operation.

Example 46. The apparatus of Example 45, wherein the adjustment operation includes a shifting operation configured to shift the at least one resource repetition associated with the second TRP by an offset period to a time that is later in a time window or a subsequent time window such that the gap is greater than the switching gap threshold.

Example 47. The apparatus of any of Examples 45 through 46, wherein the at least one resource repetition associated with the second TRP includes a first resource repetition and a second resource repetition, wherein the adjustment operation includes an altering operation configured to discard the second resource repetition from the repetition operation such that the gap is greater than the switching gap threshold.

Example 48. The apparatus of any of Examples 45 through 47, wherein the at least one resource repetition associated with the first TRP includes a first resource repetition and a second resource repetition, wherein the at least one resource repetition associated with the second TRP includes a third resource repetition, wherein the adjustment operation includes a deferral operation configured to insert a deferral period to account for one or more downlink symbols between the first resource repetition and the second resource repetition and an altering operation configured to re-map the second resource repetition that is originally associated with the first TRP to be associated with the second TRP.

Example 49. The apparatus of any of Examples 45 through 48, wherein the adjustment operation includes an omitting operation configured to omit at least one symbol from at least one of the at least one resource repetition associated with the first TRP or the at least one resource repetition associated with the second TRP.

Example 50. A method comprising transmitting, by a base station of a communication system, configuration information for an adjustment to a repetition operation of uplink control information on a physical uplink control channel, the repetition operation including at least one resource repetition associated with a first transmission-reception-point (TRP) and at least one resource repetition associated with a second TRP, the configuration information identifying an adjustment operation to be used by a user device to modify the repetition operation in response to a gap between the at least one resource repetition associated with the first TRP and the at least one resource repetition associated with the second TRP being less than a switching gap threshold; transmitting, by the base station, a resource activation message to configure or schedule the uplink control information to be transmitted using the repetition operation; and receiving, by the base station, the uplink control information according to the modified repetition operation.

Example 51. The method of Example 50, wherein the adjustment operation includes a shifting operation configured to shift the at least one resource repetition associated with the second TRP by an offset period to a time that is later in a time window or a subsequent time window such that the gap is greater than the switching gap threshold.

Example 52. The method of any of Examples 50 through 51, wherein the at least one resource repetition associated with the second TRP includes a first resource repetition and a second resource repetition, wherein the adjustment operation includes an altering operation configured to discard the second resource repetition from the repetition operation such that the gap is greater than the switching gap threshold.

Example 53. The method of any of Examples 50 through 52, wherein the at least one resource repetition associated with the first TRP includes a first resource repetition and a second resource repetition, wherein the at least one resource repetition associated with the second TRP includes a third resource repetition, wherein the adjustment operation includes a deferral operation configured to insert a deferral period to account for one or more downlink symbols between the first resource repetition and the second resource repetition and an altering operation configured to re-map the second resource repetition that is originally associated with the first TRP to be associated with the second TRP.

Example 54. The method of any of Examples 50 through 53, wherein the adjustment operation includes an omitting operation configured to omit at least one symbol from at least one of the at least one resource repetition associated with the first TRP or the at least one resource repetition associated with the second TRP.

Example 55. An apparatus comprising means for transmitting configuration information for an adjustment to a repetition operation of uplink control information on a physical uplink control channel, the repetition operation including at least one resource repetition associated with a first transmission-reception-point (TRP) and at least one resource repetition associated with a second TRP, the configuration information identifying an adjustment operation to be used by a user device to modify the repetition operation in response to a gap between the at least one resource repetition associated with the first TRP and the at least one resource repetition associated with the second TRP being less than a switching gap threshold; means for transmitting a resource activation message to configure or schedule the uplink control information to be transmitted using the repetition operation; and means for receiving the uplink control information according to the modified repetition operation.

Example 56. The apparatus of Example 55, wherein the adjustment operation includes a shifting operation configured to shift the at least one resource repetition associated with the second TRP by an offset period to a time that is later in a time window or a subsequent time window such that the gap is greater than the switching gap threshold.

Example 57. The apparatus of any of Examples 55 through 56, wherein the at least one resource repetition associated with the second TRP includes a first resource repetition and a second resource repetition, wherein the adjustment operation includes an altering operation configured to discard the second resource repetition from the repetition operation such that the gap is greater than the switching gap threshold.

Example 58. The apparatus of any of Examples 55 through 57, wherein the at least one resource repetition associated with the first TRP includes a first resource repetition and a second resource repetition, wherein the at least one resource repetition associated with the second TRP includes a third resource repetition, wherein the adjustment operation includes a deferral operation configured to insert a deferral period to account for one or more downlink symbols between the first resource repetition and the second resource repetition and an altering operation configured to re-map the second resource repetition that is originally associated with the first TRP to be associated with the second TRP.

Example 59. The apparatus of any of Examples 55 through 58, wherein the adjustment operation includes an omitting operation configured to omit at least one symbol from at least one of the at least one resource repetition associated with the first TRP or the at least one resource repetition associated with the second TRP.

Figure 14:
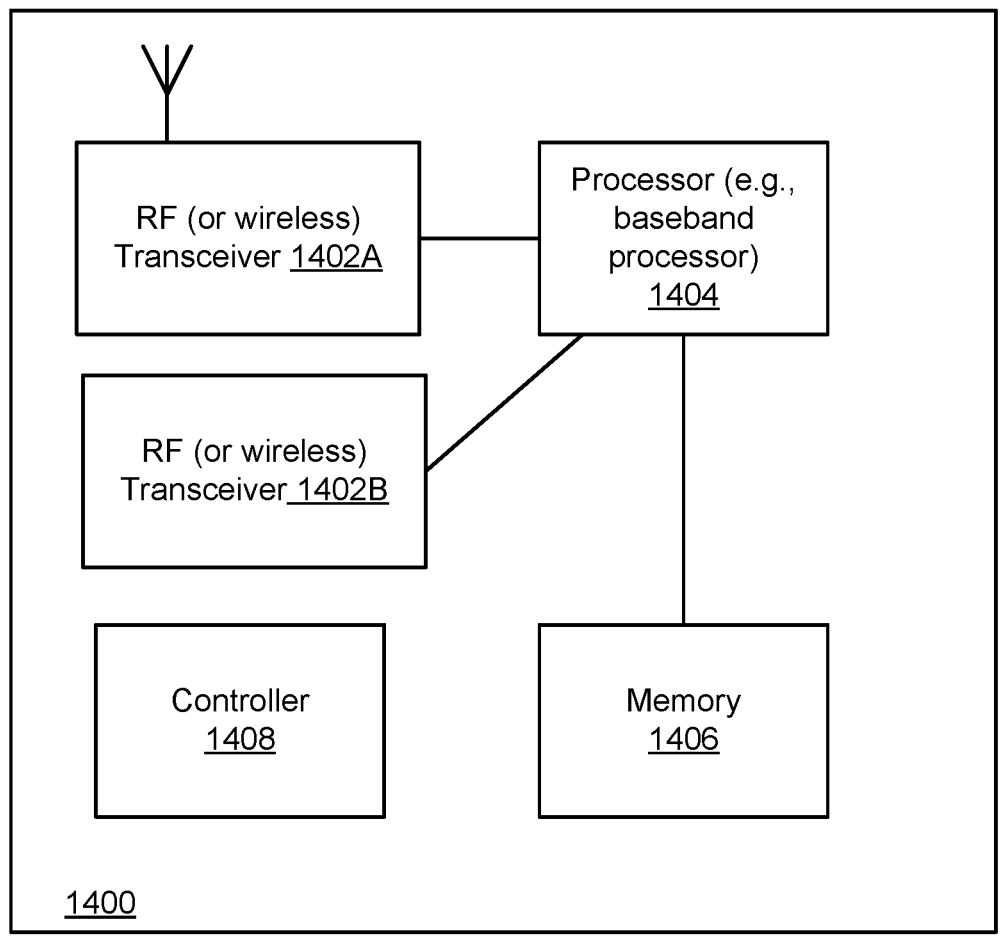
FIG. 14 is a block diagram of a wireless station according to an example implementation.

FIG. 14 is a block diagram of a wireless station (e.g., AP or user device) 1400 according to an example implementation. The wireless station 1400 may include, for example, one or two RF (radio frequency) or wireless transceivers 1402A, 1402B, where each wireless transceiver includes a transmitter to transmit signals and a receiver to receive signals. The wireless station also includes a processor or control unit/entity (controller) 1404 to execute instructions or software and control transmission and receptions of signals, and a memory 1406 to store data and/or instructions.

Processor 1404 may also make decisions or determinations, generate frames, packets or messages for transmission, decode received frames or messages for further processing, and other tasks or functions described herein. Processor 1404, which may be a baseband processor, for example, may generate messages, packets, frames or other signals for transmission via wireless transceiver 1402A or 1402B. Processor 1404 may control transmission of signals or messages over a wireless network, and may control the reception of signals or messages, etc., via a wireless network (e.g., after being down-converted by wireless transceiver 1402, for example). Processor 1404 may be programmable and capable of executing software or other instructions stored in memory or on other computer media to perform the various tasks and functions described above, such as one or more of the tasks or methods described above (e.g., any of the operations of the timing diagrams and flowcharts of the figures). Processor 1404 may be (or may include), for example, hardware, programmable logic, a programmable processor that executes software or firmware, and/or any combination of these. The processor 1404 may include one or more processors coupled to a substrate. Using other terminology, processor 1404 and transceiver 1402 together may be considered as a wireless transmitter/receiver system, for example.

In addition, referring to FIG. 14, a controller (or processor) 1408 may execute software and instructions, and may provide overall control for the station 1400, and may provide control for other systems not shown in FIG. 14, such as controlling input/output devices (e.g., display, keypad), and/or may execute software for one or more applications that may be provided on wireless station 1400, such as, for example, an email program, audio/video applications, a word processor, a Voice over IP application, or other application or software.

In addition, a storage medium may be provided that includes stored instructions, which when executed by a controller or processor may result in the processor 1404, or other controller or processor, performing one or more of the functions or tasks described above.

According to another example implementation, RF or wireless transceiver(s) 1402A/1402B may receive signals or data and/or transmit or send signals or data. Processor 1404 (and possibly transceivers 1402A/1402B) may control the RF or wireless transceiver 1402A or 1402B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input — multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor (e.g., a processor coupled to a substrate), a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (e.g., sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors (e.g., one or more processors coupled to a substrate) executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
  obtaining, by a user device of a communication system, configuration information for an adjustment to a repetition operation of uplink control information on a physical uplink control channel, the configuration information including an offset period, the repetition operation including a plurality of resource repetitions, the plurality of resource repetitions including consecutive resource repetitions;

determining, by the user device, whether a gap between the consecutive resource repetitions is less than a switching gap threshold, the consecutive resource repetitions including a first resource repetition associated with a first transmission-reception-point (TRP) and a second resource repetition associated with a second TRP;

modifying, by the user device, the repetition operation using the configuration information in response to the gap being determined as less than the switching gap threshold, the modifying including shifting the second resource repetition by the offset period such that the gap is equal to or greater than the switching gap threshold; and transmitting, by the user device, the uplink control information according to the modified repetition operation.

2. The method of claim 1, further comprising:
executing a deferral operation to account for one or more downlink symbols in the repetition operation, the deferral operation configured to move at least one resource repetition of the plurality of resource repetitions from a first time location to a second time location in a time window or a subsequent time window.

3. The method of claim 1, wherein the second resource repetition is shifted by the offset period to a time that is later in a time window or a subsequent time window.

4. The method of claim 1, wherein the offset period has a first offset value when a format of the physical uplink control channel is a first type and the offset period has a second offset value when the format of the physical uplink control channel is a second type, the method further comprising:
determining that the format of the physical uplink control channel is the second type; and
selecting the second offset value for the offset period.

5. The method of claim 1, wherein the offset period has a first offset value when the physical uplink control channel is a first type of uplink resource and the offset period has a second offset value when the physical uplink control channel is a second type of uplink resource.

6. The method of claim 1, further comprising:
determining that at least one of a shifting operation or a deferral operation causes a number of resource repetitions associated with the first TRP within a time window to be less than a threshold level; and
re-mapping the second resource repetition to be associated with the first TRP.

7. The method of claim 1, further comprising:
determining that at least one of a shifting operation or a deferral operation causes at least one resource repetition of the plurality of resource repetitions to not fit within a time window; and
discarding the at least one resource repetition from the repetition operation.

8. The method of claim 1, wherein the modifying the repetition operation includes omitting at least one symbol from at least one of the first resource repetition or the second resource repetition.

9. The method of claim 1, wherein the modifying the repetition operation includes re-mapping the first resource repetition to be associated with the second TRP or re-mapping the second resource repetition to be associated with the first TRP.

10. The method of claim 1, wherein the configuration information is received over a network from a base station.

11. An apparatus comprising:
at least one processor; and
at least one memory including computer program code,
the at least one memory and the computer program code configured to, with the at least one processor, cause the apparatus to:
obtain configuration information for an adjustment to a repetition operation of uplink control information on a physical uplink control channel, the repetition operation defining a number of resource repetitions towards multiple transmission-reception-points (TRPs), the configuration information including an offset period;
insert a deferral period to account for one or more downlink symbols within a time window of the repetition operation;
determine whether a gap between consecutive resource repetitions is less than a switching gap threshold, the consecutive resource repetitions including a first resource repetition associated with a first TRP and a second resource repetition associated with a second TRP;
modify the repetition operation using the configuration information in response to the gap being determined as less than the switching gap threshold, including shifting the second resource repetition by the offset period such that the gap is increased to be to equal or greater than the switching gap threshold; and
transmit the uplink control information according to the modified repetition operation.

12. The apparatus of claim 11,
wherein the second resource repetition is shifted by the offset period to a time that is later in the time window or a subsequent time window.

13. The apparatus of claim 11, wherein the gap includes the deferral period.

14. The apparatus of claim 11, wherein the gap does not include the deferral period.

15. The apparatus of claim 11, wherein the at least one memory and the computer program code are configured to, with the at least one processor, cause the apparatus to:
determine that at least one of a deferral operation or a shifting operation causes a number of resource repetitions associated with the first TRP within the time window to be less than a threshold level; and
re-mapping a resource repetition that is originally associated with the second TRP to be associated with the first TRP.

16. The apparatus of claim 11, wherein the at least one memory and the computer program code are configured to, with the at least one processor, cause the apparatus to:
determine that at least one of a deferral operation or a shifting operation causes a third resource repetition to not fit within a time window; and
discard the third resource repetition from the repetition operation.

17. A non-transitory computer-readable medium storing executable instructions that when executed by at least one processor cause the at least one processor to execute operations, the operations comprising:
transmitting, by a base station of a communication system, configuration information for an adjustment to a repetition operation of uplink control information on a physical uplink control channel, the repetition operation including a first resource repetition associated with a first transmission-reception-point (TRP) and a second resource repetition associated with a second TRP, the configuration information identifying an adjustment operation to be used by a user device to modify the repetition operation in response to a gap between the first resource repetition and the second resource repetition being less than a switching gap threshold, the configuration information including an offset period, the adjustment operation including a shifting operation configured to shift the second resource repetition by the offset period such that the gap is equal to or greater than the switching gap threshold;

transmitting, by the base station, a resource activation message to configure or schedule the uplink control information to be transmitted using the repetition operation; and receiving, by the base station, the uplink control information according to the modified repetition operation.

18. The non-transitory computer-readable medium of claim 17, wherein the second resource repetition is shifted by the offset period to a time that is later in a time window or a subsequent time window such that the gap is greater than the switching gap threshold.

19. The non-transitory computer-readable medium of claim 18, wherein the repetition operation includes a third resource repetition associated with the second TRP, wherein the adjustment operation includes an altering operation configured to discard the third resource repetition from the repetition operation.

20. The non-transitory computer-readable medium of claim 17, wherein the repetition operations includes a third resource repetition associated with the first TRP and a fourth resource repetition associated with the second TRP, wherein the adjustment operation includes a deferral operation configured to insert a deferral period to account for one or more downlink symbols between the first resource repetition and the third resource repetition or an altering operation configured to re-map the third resource repetition to be associated with the second TRP.

21. The non-transitory computer-readable medium of claim 17, wherein the adjustment operation includes an omitting operation configured to omit at least one symbol from at least one of the first resource repetition or the second resource repetition.

* * * * *